(12) United States Patent
Tanemura et al.

(10) Patent No.: US 10,942,608 B2
(45) Date of Patent: Mar. 9, 2021

(54) SPATIALLY ENCODED SENSOR ELECTRODES

(71) Applicant: SYNAPTICS INCORPORATED, San Jose, CA (US)

(72) Inventors: Tetsuo Tanemura, Tokyo (JP); Petr Shepelev, Campbell, CA (US)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 15/961,570

(22) Filed: Apr. 24, 2018

(65) Prior Publication Data

US 2019/0324573 A1  Oct. 24, 2019

(51) Int. Cl.
  *G06F 3/044*  (2006.01)
  *G06F 3/0488*  (2013.01)
  *G06F 3/0354*  (2013.01)

(52) U.S. Cl.
  CPC .......... *G06F 3/044* (2013.01); *G06F 3/03547* (2013.01); *G06F 3/0488* (2013.01); *G06F 2203/04112* (2013.01)

(58) Field of Classification Search
  CPC combination set(s) only.
  See application file for complete search history.

(56) References Cited

U.S. PATENT DOCUMENTS

| | | | |
|---|---|---|---|
| 9,256,327 B2* | 2/2016 | Salaverry | G06F 3/044 |
| 2011/0175671 A1 | 7/2011 | Reynolds | |
| 2013/0016065 A1 | 1/2013 | Reynolds et al. | |
| 2015/0091587 A1* | 4/2015 | Shepelev | G06F 3/041662 324/658 |
| 2015/0091842 A1 | 4/2015 | Shepelev et al. | |
| 2015/0130753 A1* | 5/2015 | Woo | G06F 3/044 345/174 |
| 2016/0092019 A1* | 3/2016 | Huang | G06F 3/0416 345/174 |
| 2017/0255295 A1 | 9/2017 | Tanemura et al. | |

* cited by examiner

*Primary Examiner* — Nitin Patel
*Assistant Examiner* — Amen Woldesenbet Bogale
(74) *Attorney, Agent, or Firm* — Leydig, Voit & Mayer, Ltd.

(57) ABSTRACT

A capacitive sensing device has a first plurality of sensor electrodes, and a second plurality of sensor electrodes overlapping the first plurality of sensor electrodes. A first sensor electrode of the second plurality of electrodes overlaps a first subset of the first plurality of electrodes and comprises apertures disposed according to first codes. The first codes comprise first and second coefficients and along one of the first plurality of sensor electrodes. Each aperture may correspond to one of the first coefficients. The capacitive sensing device further comprises a processing system coupled to the first and second plurality of sensor electrodes. The processing system may be configured to receive resulting signals with the second plurality of sensor electrodes to determine positional information for an input object within a sensing region of the capacitive sensing device.

18 Claims, 12 Drawing Sheets

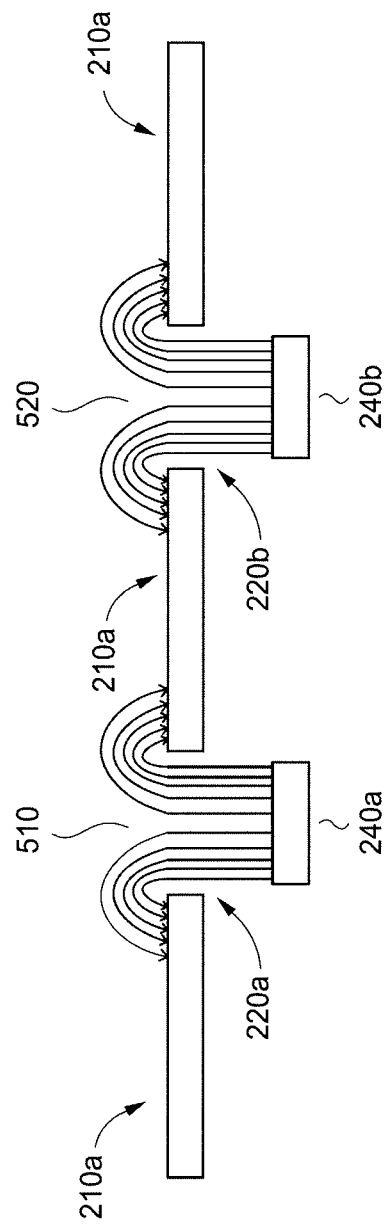
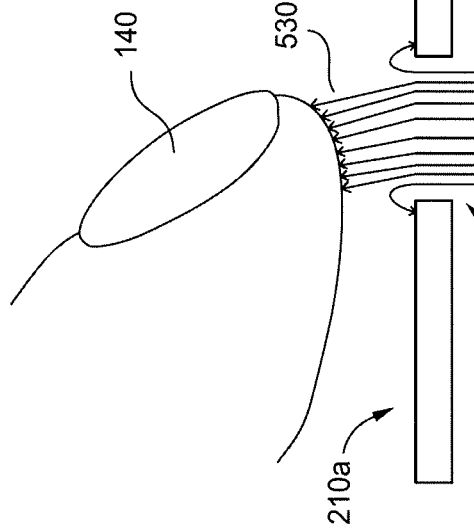
FIG. 5A
FIG. 5B

SPATIALLY ENCODED SENSOR ELECTRODES

TECHNICAL FIELD

Embodiments of disclosure generally relate to electronic devices and, more particularly, to sensing devices with sensor electrodes.

BACKGROUND

Input devices, including proximity sensor devices (e.g., touchpads or touch sensor devices), are widely used in a variety of electronic systems. A proximity sensor device may include a sensing region, often demarked by a surface, in which the proximity sensor device determines the presence, location and/or motion of one or more input objects. Proximity sensor devices may be used to provide interfaces for the electronic system. For example, proximity sensor devices may be used as input devices for larger computing systems (e.g., opaque touchpads integrated in, or peripheral to, notebook or desktop computers). Proximity sensor devices are also often used in smaller computing systems (e.g., touch screens integrated in cellular phones). Proximity sensor devices may also be used to detect input objects (e.g., finger, styli, pens, fingerprints, etc.).

SUMMARY

In one embodiment, a sensing device comprises a first plurality of sensor electrodes, and a second plurality of sensor electrodes. A first sensor electrode of the second plurality of electrodes overlaps a first subset of the first plurality of electrodes and comprises apertures disposed according to a first set of codes and along one of the first plurality of sensor electrodes.

In one embodiment, a processing system for sensing device comprises transmitter circuitry, receiver circuitry and a determination module. The transmitter circuitry is configured to drive transmitter signals onto a first subset of a first plurality of sensor electrodes. The receiver circuitry is configured to receive resulting signals corresponding to the transmitter signals with a second plurality of sensor electrodes, a first sensor electrode of the second sensor electrodes of the second plurality of sensor electrodes overlaps the first subset and comprise first apertures arranged according to first codes and the first subset of the first plurality of sensor electrodes. The determination module is configured to determine first positional information for an input object in a second portion of a sensing region of the sensing device based on the resulting signals.

In one embodiment, an input device comprises a first and second plurality of sensor electrodes and a processing system. A first sensor electrode and a second sensor electrode of the second plurality of electrodes overlaps a first subset of the first plurality of electrodes and comprise apertures disposed according to a first set of codes comprising first and second coefficients and along one of the first plurality of sensor electrodes. The processing system coupled to the first and second plurality of sensor electrodes. The processing system is configure to drive transmitter signals onto the sensor electrodes of the first subset of the first plurality of sensor electrodes and receive first resulting signals corresponding to the transmitter signals with the first sensor electrode and the second sensor electrodes of the second plurality of sensor electrodes. The processing system is further configured to determine first positional information for an input object in a second portion of the sensing region of the sensing device based on the first resulting signals.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only some embodiments of this disclosure and are therefore not to be considered limiting of its scope, for the disclosure may admit to other equally effective embodiments.

FIGS. 5A and 5B illustrate capacitive coupling between sensor electrodes according to one or more embodiments.

Figure 1:
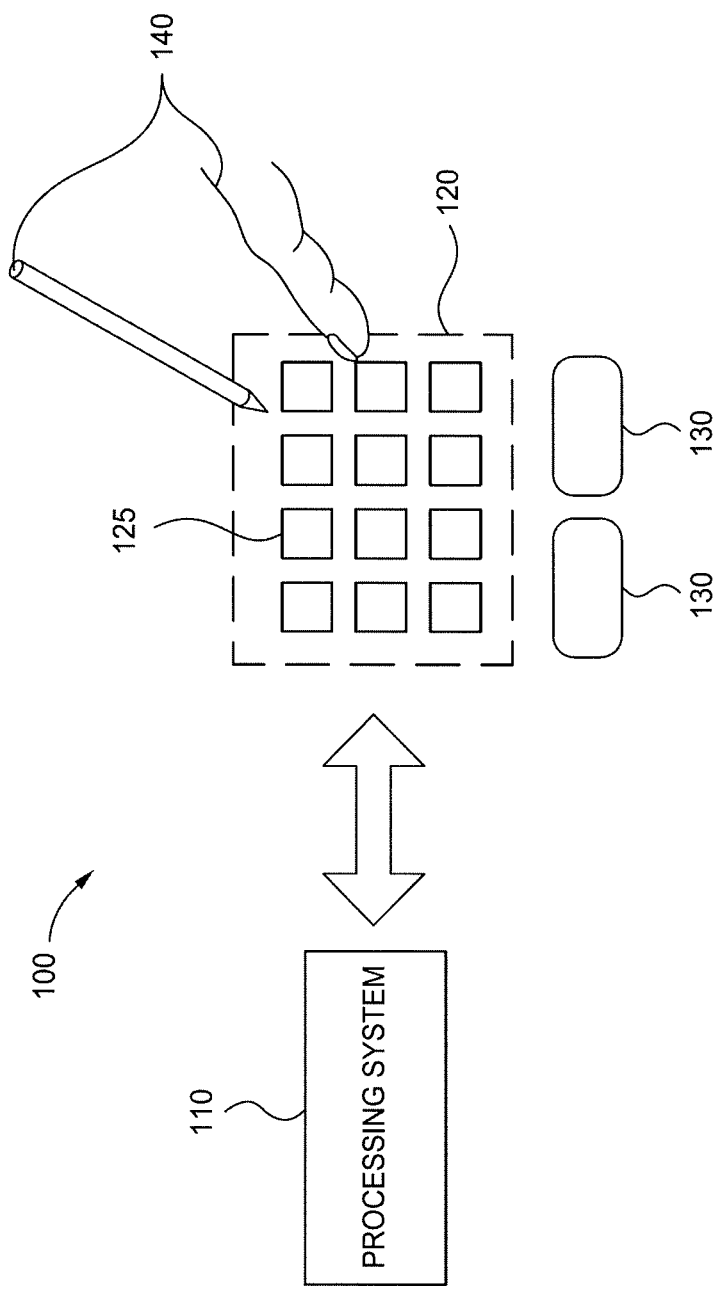
FIG. 1 is a schematic block diagram of an exemplary input device, according to one or more embodiments.

To facilitate understanding, identical reference numerals have been used, where possible, to designate identical elements that are common to the Figures. It is contemplated that elements disclosed in one embodiment may be beneficially utilized on other embodiments without specific recitation. The drawings should not be understood as being drawn to scale unless specifically noted. Also, the drawings may be simplified and details or components omitted for clarity of presentation and explanation. The drawings and discussion serve to explain principles discussed below, where like designations denote like elements.

DETAILED DESCRIPTION

FIG. 1 is a block diagram of an exemplary input device 100, in accordance with embodiments of the disclosure. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects 140 include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

Sensing region 120 may include one or more portions. For example, a second portion of the sensing region may be between a surface of the input device 100 and a first portion of the sensing region.

The input device 100 may utilize any combination of sensor components and sensing technologies to detect user input in the sensing region 120. The input device 100 comprises one or more sensing elements 125 for detecting user input.

Some implementations are configured to provide images that span one, two, three, or higher dimensional spaces. Some implementations are configured to provide projections of input along particular axes or planes.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self-capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes. In one embodiment, processing system 110 includes one or more of a sensor module, a display module and a determination module. Further, the sensor module may include sensor circuitry and the display module may include display circuitry. For example, the sensor module may include receiver circuitry configured to receive resulting signals from one or more sensor electrodes and/or transmitter circuitry configured to drive one or more sensor electrodes with modulated signals. The display module may include source drivers configured to drive source electrodes with display data to update a display of a display device.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. Such electrical signals are often referred to as resulting signals. The processing system 110 may perform any appropriate amount of processing on the electrical signals in producing the information provided to the electronic system. For example, a determination module of processing system 110 may digitize analog electrical signals obtained from the sensor electrodes. As another example, the determination module of processing system 110 may perform filtering or other signal conditioning. As yet another example, the determination module of the processing system 110 may subtract or otherwise account for a baseline, such that the information reflects a difference between the electrical signals and the baseline. As yet further examples, the determination module of the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the disclosure are described in the context of a fully functioning apparatus, the mechanisms of the present disclosure are capable of being distributed as a program product (e.g., software) in a variety of forms. For example, the mechanisms of the present disclosure may be implemented and distributed as a software program on information bearing media that are readable by electronic processors (e.g., non-transitory computer-readable and/or recordable/writable information bearing media readable by the processing system 110). Additionally, the embodiments of the present disclosure apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
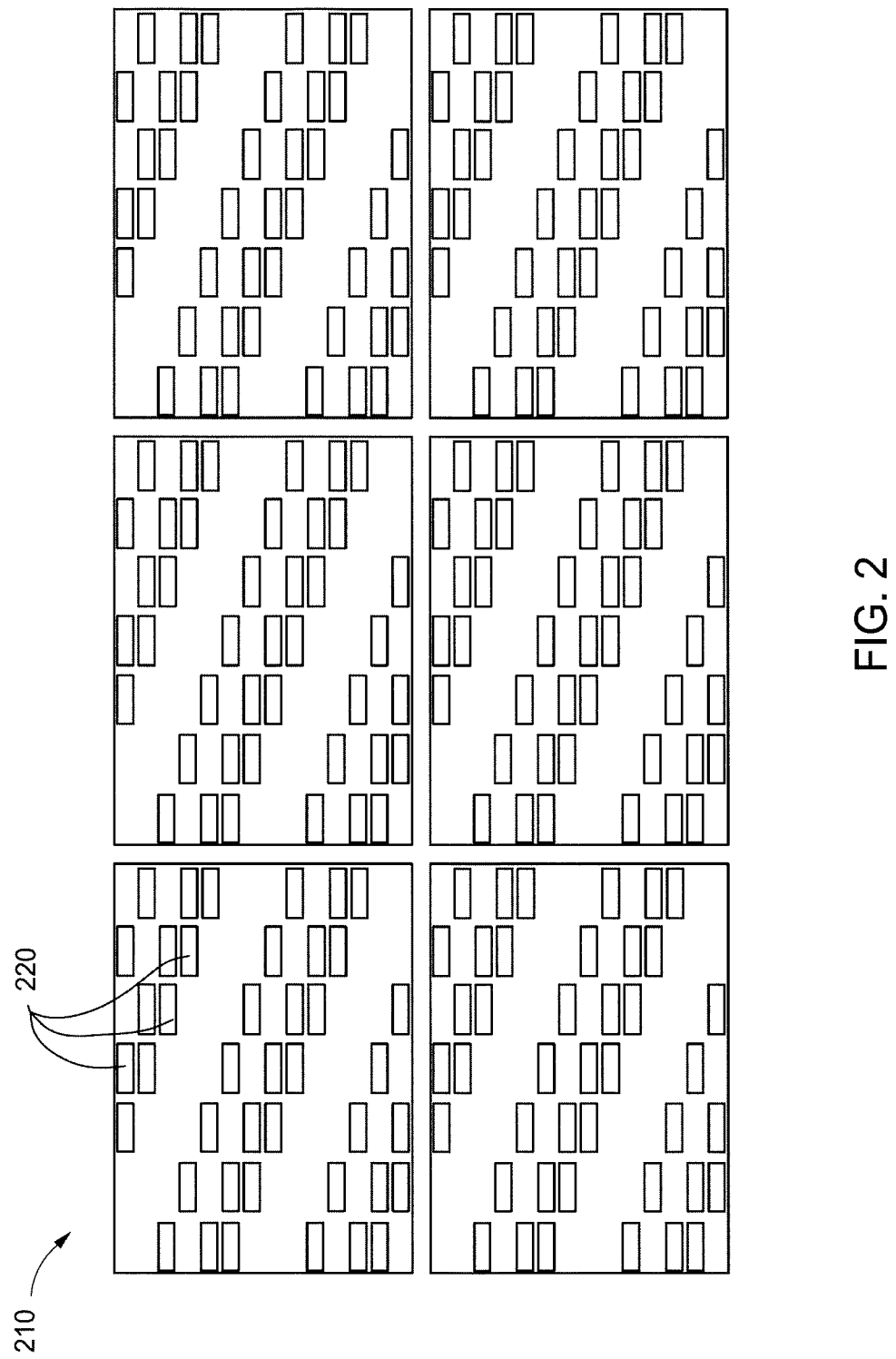
FIGS. 2 and 3 illustrate spatially encoded sensor electrodes according to one or more embodiments.

FIG. 2 illustrates a portion of an exemplary pattern of sensor electrodes 210, each having apertures 220 configured to sense in the sensing region 120, according to some embodiments. For clarity of illustration and description, FIG. 2 presents the sensor electrodes 210 in a pattern of simple rectangles. In one embodiment, the sensor electrodes form areas of localized capacitance of capacitive coupling. The areas of localized capacitance may be used to determine one or more capacitive pixels of a capacitive image. Further, the areas of localized capacitance may be formed between individual sensor electrodes and ground in a first mode of operation and between groups of sensor electrodes used as transmitter and receiver electrodes in a second mode of operation. The capacitive coupling changes with the proximity and motion of input objects in the sensing region 120 associated with the sensor electrodes, and thus may be used as an indicator of the presence of the input object in the sensing region 120 of the input device. In one embodiment, the first mode of operation may be used to detect input objects spaced from the input device 100, in a first portion of the sensing region, and the second mode of operation may be used to detect input objects in contact with or in close proximity to the input device 100, in a second portion of the sensing region. The second portion of the sensing region extends from a surface of the input device to the first portion of the sensing region. The first portion may be referred to as a hover portion of the sensing region and the second portion may be referred to as a touch portion of the sensing region. In one embodiment, sensing input objects in the second portion of the sensing region may be referred to as touch sensing and sensing input objects in the first portion of the sensing region may be referred to as hover sensing.

The exemplary pattern comprises an array of sensor electrodes 210 arranged in X columns and Y rows in a common plane, wherein X and Y are positive integers. It is contemplated that the pattern of sensor electrodes 210 may have other configurations, such as polar arrays, repeating patterns, non-repeating patterns, non-uniform arrays a single row or column, or other suitable arrangement. Further, as will be discussed in more detail below, the sensor electrodes 210 may be any shape such as circular, rectangular, diamond, star, square, noncovex, convex, nonconcave concave, etc. Further, as is illustrated in FIG. 4, the sensor electrodes 210 are coupled to the processing system 110 and utilized to determine the presence (or lack thereof) of an input object in the sensing region 120.

In one or more embodiments, the sensor electrodes 210 are spatially encoded. For example, the shape of sensor electrodes 210 may be spatially encoded according to one or more pseudorandom noise (PN) codes. In one embodiment, the shape of sensor electrodes 210 is spatially coded by forming apertures within the sensor electrodes 210 according to one or more patterns. Further, the patterns may correspond to one or more sets of codes.

As illustrated in FIG. 2, the apertures 220 of each sensor electrode are disposed according to a first pattern. In one embodiment, the apertures of each electrode may be arranged according to a common pattern. In other embodiments, the apertures of one or more sensor electrodes may be disposed according to a first pattern and the apertures of another sensor electrode are disposed according to a second pattern that is different than the first pattern.

In one embodiment, the pattern of the apertures is based on one or more sets of codes. The codes may correspond to one or more PN codes. For example, the apertures may be disposed according to Barker codes, maximal length sequence (MLS) codes, Kasami codes, and/or a Gold codes. In other embodiments, other codes may be utilized.

In one or more embodiments, the apertures are disposed in plurality of rows and columns within each sensor electrode 210. Further, the position of each aperture may correspond to the coefficients of a corresponding code. In the embodiment illustrated in FIG. 3, sensor electrode 210a includes apertures 220a-220c and conductive portions 230a-230f, aligned in rows $R_1$-$R_3$ and columns $C_1$-$C_3$. The apertures may be areas of the sensor electrode that are at least substantially free from conductive material. For example, the apertures may comprise any opening, gap, slot, channel, perforation, passage, or hole in the sensor electrode. Each of the apertures may have a common shape and size, or at least one aperture may have a different shape and size than another aperture. In one embodiment, each aperture may be disposed according to a first coefficient of a set of codes and each conductive portion may be disposed according to a second coefficient of a set of codes.

Figure 3:
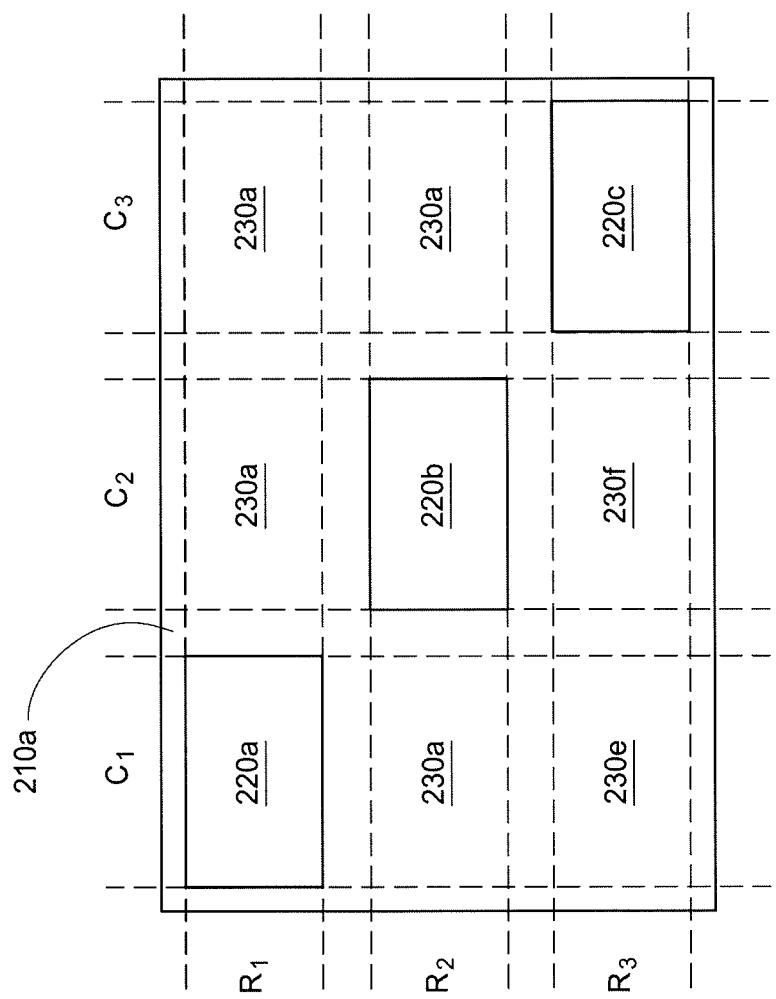

In the embodiment of FIG. 3, the apertures 220a-220c are disposed according to the corresponding rows and columns of a set of codes represented by codes $$\begin{bmatrix} 0 & 1 & 1 \\ 1 & 0 & 1 \\ 1 & 1 & 0 \end{bmatrix},$$

where each aperture (220a, 220b, and 220c) corresponds to a first coefficient of the code (e.g., a "0" coefficient of the code) and each conductive portion is disposed according to a second coefficient of the code (e.g., a "1" coefficient of the code). In various embodiments, utilizing two coefficients equalizes the spatial distribution of the corresponding sensor electrodes for an increased pixel response, and reduces background capacitance of the sensor electrodes. Background capacitance corresponds to the capacitive coupling between the sensor electrodes and other conductors within an input device (e.g., input device 100).

The apertures may be disposed according to "1" coefficients of the code and conductive portions may be disposed according to "0" coefficients of the code. Further, in other embodiments, other coefficient values may be used. The coefficient values correspond to an "aperture ratio" of each aperture. For example, for binary codes having "0" and "1" coefficients, a 0 coefficient may correspond to an "aperture ratio" of 100%, where the corresponding areas of the sensor electrode are completely open or free from conductive material. A 1 coefficient may correspond to an "aperture ratio" of 0% where the corresponding areas of the sensor electrode are solid, and/or completely shield a transmitter electrode from an input object such that field lines from the transmitter electrode do not terminate within the input object. In one or more embodiments, the aperture ratios of the "0" and "1" coefficients may be reversed. In other embodiments, utilizing codes having more than two coefficients provides for "aperture ratios" between 0% and 100%. For example, an "aperture ratio" of 50% provides about half the coupling between sensor electrodes as compared to an "aperture ratio" of 0%. In one embodiment, the coupling may be controlled by varying the size, thickness, and/or shape of the apertures, and/or the material making up the sensor electrodes. In various embodiments, other "aperture ratio" may correspond to different coupling amounts. For example, the codes may include four coefficients, 0, 1, 2, and 4. In such an example, the 0 coefficient corresponds to an "aperture ratio" of 0%, the 4 coefficient corresponds to 100%. Further, the 1 and 2 coefficients correspond to "aperture ratios" between 0% and 100%. For example, the 1 coefficient may correspond to an "aperture ratio" of 33% and the 2 coefficient corresponds to an "aperture ratio" of 66%. In other embodiment, non-integer coefficients may be used in addition to or alternatively to integer coefficients.

In the embodiment of FIG. 3, the first row of the codes includes [0 1 1], the second row of the codes includes [1 0

Figure 4A:
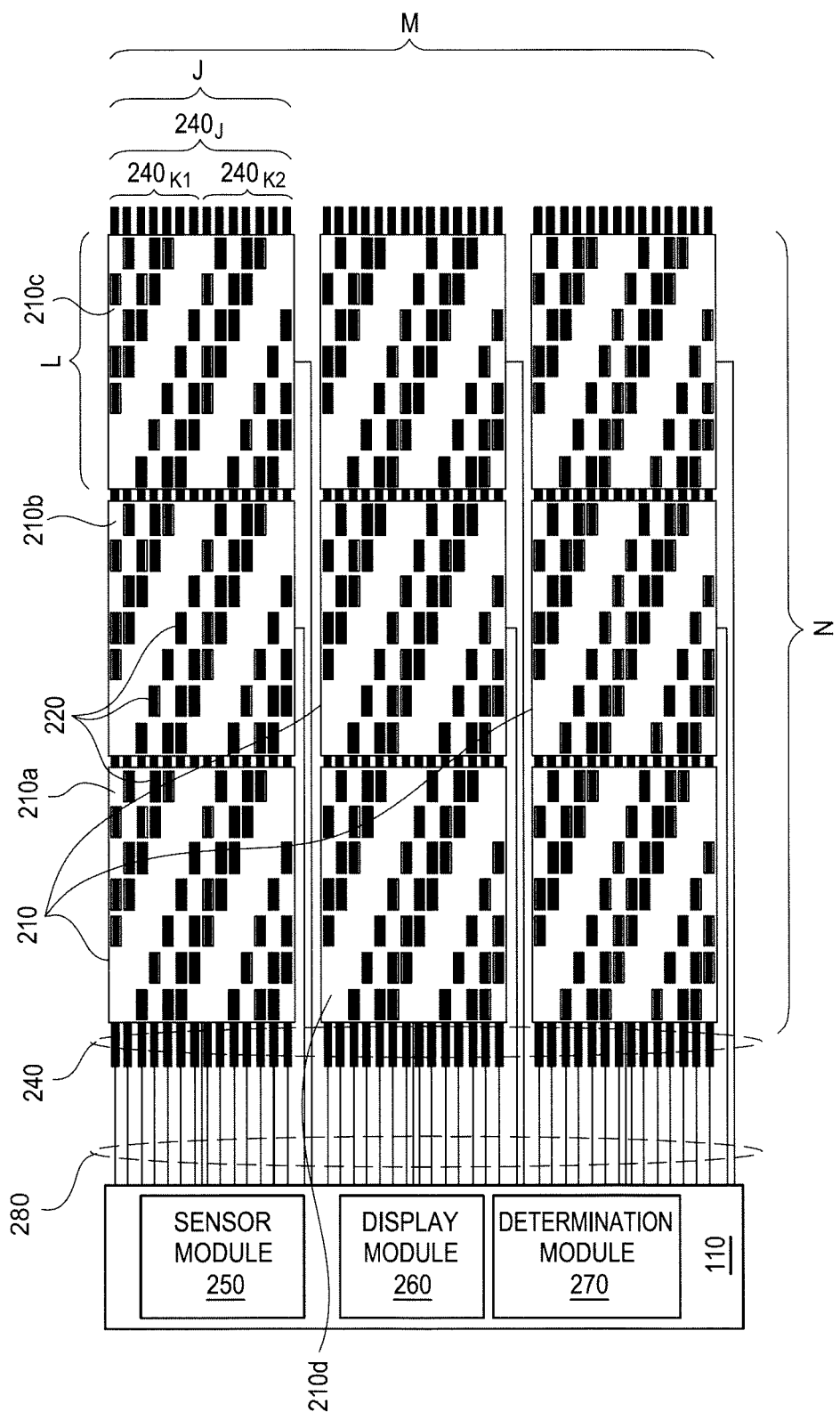
FIGS. 4A and 4B illustrate exemplary input devices according to one or more embodiments.

1], and the third row of the codes includes [1 1 0]. Row $R_1$ of sensor electrode 210a corresponds to the first row of the codes. Accordingly, an aperture is disposed at position $C_1$ and conduction portions are disposed at positions $C_2$ and $C_3$. Row $R_2$ of sensor electrode 210a corresponds to the second row of the codes. Accordingly, an aperture is disposed at position $C_2$, while conductive portions are disposed at positions $C_1$ and $C_3$. Further, row $R_3$ of sensor electrode 210a corresponds to the third row of the codes. Accordingly, an aperture is disposed at position $C_3$, and a conductive portion is disposed at positions $C_1$ and $C_2$. Each row of sensor electrode 210a corresponds to the location of each sensor electrode 240 as shown in FIG. 4A. While the embodiment of FIG. 3 illustrates apertures disposed according to a code length of three, in other embodiments, other code lengths may be used. For example, a code length of 7, 11, 13, 15, or greater may be used. In one or more embodiments, in one or more of the rows, there are at least two apertures. Further, in some embodiments, there are more than two apertures row.

FIG. 4A illustrates one embodiment of an arrangement of sensor electrodes 210, sensor electrodes 240, processing system 110, and traces 280. Sensor electrodes 210 form an array of columns and rows in a common plane, and each sensor electrode 210 includes a plurality of apertures 220. The apertures 220 in each row are aligned with one of the sensor electrodes 240 in the same row. Sensor electrodes 240 are arranged in a stripe or bar form, each disposed in parallel to each other in a first direction. Sensor electrodes 240 are disposed on separate layer from the sensor electrodes 210. In one embodiment, sensor electrodes 240 extend under the sensor electrodes 210 in a second direction perpendicular to the first direction. Further, the sensor electrodes 210 and 240 are coupled to processing system 110 via traces 280.

The processing system 110 includes sensor module 250 and determination module 270. Further, processing system 110 may include optional display module 260 that is configured to drive display circuitry to update display electrodes of a display device. As illustrated, the pitch of sensor electrodes 210 is larger than the pitch of sensor electrodes 240.

The sensor module 250 may include sensor circuitry including one or more amplifiers, analog to digital converters, digital to analog converters, filters, and/or mixers. Further, the display module 260 may include display circuitry including one or more amplifiers and/or analog to digital converters configured to drive one or more display electrodes to update a display.

In a first mode of operation, at least one sensor electrode within the sensor electrodes 210 and/or 240 may be utilized to detect the presence of an input object via absolute sensing techniques in a first portion of the sensing region 120. For example, the sensor circuitry of sensor module 250 is configured to modulate or drive one or more sensor electrodes using one or more routing traces 280 with a modulated signal (i.e., a capacitive sensing signal) and receive a resulting signal from the one or more sensor electrodes comprising effects according to the modulated signal to determine changes an absolute capacitance between each driven sensor electrode and the input object (e.g., free space or earth ground). The sensor circuitry of sensor module 250 may apply one or more signal processing techniques to the resulting signals and communicate the resulting signals to the determination module 270. In one embodiment, the sensor circuitry of sensor module 250 filters and converts the resulting signals from an analog signal to a digital signal before communicating to the determination module 270.

In a second mode of operation, sensor electrodes 210 and 240 are utilized to detect the presence of an input object via transcapacitance sensing techniques in a second portion of the sensing region. That is, processing system 110 may drive at least one sensor electrode 240 with a transmitter signal and receive resulting signals using one or more of sensor electrodes 210, where a resulting signal comprising effects corresponding to the transmitter signal. The resulting signal is utilized by the determination module 270 of processing system 110 or another processor to determine the position of the input object. For example, in one embodiment, the determination module 270 receives the resulting signals from the sensor module and removes a baseline from the resulting signals. The determination module 270 then demodulates the resulting signals according to the codes which the apertures are based on to determine measurements of changes in capacitance between first and second sensor electrodes. In one embodiment, demodulating the resulting signals according the codes comprises decoding the resulting signals according to the codes. Further, the determination module 270 is configured to compare the measurements of the changes in capacitance to one or more threshold values. In one embodiment, the determination module 270 is configured to generate a capacitive image based on the determined measurements of the changes in capacitance. The determination module 270 may be configured to determine positional information from the capacitive image. In another embodiment, the determination module is configured to communicate the determined measurements of the changes in capacitance to another element of the processing system 110 or an external processor, which is configured to determine at least one of a capacitive image and positional information for an input object from the determined measurements of the changes in capacitance.

As is stated above, in one or more embodiments, the determination module 270 is configured to access a memory of processing system 110 comprising the codes used to arrange the apertures. Further, in one embodiment, the determination module 270 accesses a memory of processing system 110 to acquire the codes used to generate the transmitter signals. In another embodiment, the sensor module 250 communicates the codes used to generate the transmitter signals to the determination module 270.

In some embodiments, the sensor electrodes are scanned to determine changes in capacitive coupling. That is, in one embodiment, one or more of the sensor electrodes are driven to transmit transmitter signals. Transmitters may be operated such that one transmitter electrode transmits at one time, or multiple transmitter electrodes transmit at the same time. Where multiple transmitter electrodes transmit simultaneously, the multiple transmitter electrodes may transmit the same transmitter signal and effectively produce an effectively larger transmitter electrode. Alternatively, the multiple transmitter electrodes may transmit different transmitter signals. For example, multiple transmitter electrodes may transmit different transmitter signals according to one or more coding schemes (e.g., driving the sensor electrodes with transmitter signals based on different codes) that enable their combined effects on the resulting signals of receiver electrodes to be independently determined. In one embodiment, transmit different transmitter signals according to one or more coding schemes may be referred to as applying code division multiplexing techniques to the transmitter electrodes.

The sensor electrodes configured as receiver sensor electrodes may be operated singly or multiply to acquire resulting signals. The resulting signals may be used to determine measurements of the capacitive couplings.

In other embodiments, "scanning" the sensor electrodes to determine changes in capacitive coupling includes driving with a modulated signal and measuring the absolute capacitance of one or more of the sensor electrodes (e.g., sensor electrodes 210 and/or sensor electrodes 240). In another embodiment, the sensor electrodes may be operated such that the modulated signal is driven on multiple sensor electrodes at the same time. In such embodiments, an absolute capacitive measurement may be obtained from each modulated sensor electrode simultaneously. In one embodiment, the input device 100 simultaneously drives a sensor electrode and measures an absolute capacitive measurement for each sensor electrode in the same sensing cycle.

In various embodiments, processing system 110 may configured to selectively drive and receive with a portion of sensor electrodes. For example, the sensor electrodes may be selected based on, but not limited to, an application running on the host processor, a status of the input device, an operating mode of the sensing device and a determined location of an input device.

In one or more embodiments, the processing system 110 may be configured to operate sensor electrodes 210 in an absolute capacitive sensing mode during a first time period and operate sensor electrodes 210 and 240 in a transcapacitive sensing mode during a second time period non-overlapping with the first time period. In such embodiments, the processing system 110 is configured to operate sensor electrodes 210 as absolute capacitive sensor electrodes to detect input objects in a first portion of the sensing region and operate sensor electrodes 210 and 240 as transcapacitive sensor electrode to detect input objects in a second portion of the sensing region, where the second portion of the sensing region extends from a surface of the input device to the first portion of the sensing region. Detecting input objects in the second portion of the sensing region may be referred to as hover detection and detecting input objects in the first portion of the sensing region may be referred to as touch detection. In one or more embodiments, the second portion of the sensing region may be about 1 cm to about 7 cm from the surface of the input device. In other embodiments, the second portion of the sensing region may include portions of the sensing region that are less than 1 cm from the sensing surface and or greater than 7 cm from the sensing surface.

In one embodiment, the processing system 110 is configured to switch between operating in an absolute capacitive sensing mode and operating in a transcapacitive sensing mode based on one or more trigger events. For example, the processing system 110 may be configured to switch from operating in an absolute capacitive sensing mode to the transcapacitive sensing mode based on the detection of one or more input objects in the first portion of the sensing region 120, a period of time, and/or an external control signal. Further, the processing system 110 may be configured to switch from operating in a transcapacitive sensing mode to the absolute capacitive sensing mode based on the lack of detection of one or more input objects in the second portion of the sensing region, a period of time, and/or an external control signal. In one embodiment, the absolute capacitive sensing mode may be used as a low power operating mode and the transcapacitive sensing mode ay be used as a normal operating mode.

The processing system 110 may be configured to capture a sensing frame according to an absolute capacitive sensing mode and a sensing frame according to the transcapacitive sensing mode during each sensing period. In other embodiments, a transcapacitive sensing frame is captured during each sensing period, and an absolute capacitive sensing frame is captured in every other, every third or more sensing periods. In other embodiments, an absolute capacitive sensing frame is captured during each sensing period, and a transcapacitive sensing frame is captured in every other, every third or more sensing periods.

A set of measurements from the sensor electrodes form a capacitive image representative of the capacitive couplings as discussed above. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region. In one embodiment, sensor electrodes 210 may be operated in an absolute capacitive sensing mode to determine first measurements of the corresponding capacitive couplings which may be used to form a first capacitive image, and sensor electrodes 240 and 210 may be operated in a transcapacitive sensing mode to determine second measurements of the corresponding capacitive couplings to form a second capacitive image. In one embodiment, the first capacitive image may be coarser than the second capacitive image. For example, the capacitive pixels of the first capacitive image are larger than the capacitive pixels of the second capacitive image, and the number of capacitive pixels in the first capacitive image is less than the number of capacitive pixels in the second capacitive image.

In some embodiments, one or more of the sensor electrodes include one or more display electrodes used in updating the display of the display screen. In one or more embodiment, the display electrodes comprise one or more segments of a Vcom electrode (i.e., common electrodes), a source drive line, gate line, an anode electrode or cathode electrode, or any other display element. These display electrodes may be disposed on an appropriate display screen substrate. For example, the electrodes may be disposed on a transparent substrate (e.g., a glass substrate, TFT glass, or any other transparent material) in some display screens (e.g., In Plane Switching (IPS) or Plane to Line Switching (PLS) Organic Light Emitting Diode (OLED)), on the bottom of the color filter glass of some display screens (e.g., Patterned Vertical Alignment (PVA) or Multi-domain Vertical Alignment (MVA)), over an emissive layer (OLED), etc. In such embodiments, an electrode that is used as both a sensor and a display electrode can also be referred to as a combination electrode, since it performs multiple functions.

In one embodiment, the sensor electrodes 240 comprise one or more display electrodes. For example, each of the sensor electrodes 240 comprises one or more segments of a segmented Vcom electrode. In one embodiment, the sensor electrodes 210 may be disposed on a color filter glass, a polarizer, or a lens of a display. In other embodiments, the sensor electrodes 210 may be disposed on a substrate external to the display. As will be discussed in greater detail below with regard to FIG. 4B, the sensor electrode 240 may be disposed on substrate a display device and the sensor electrodes 210 may be disposed on a color filter glass or another substrate within or external to the display device.

The sensor electrodes 210 and sensor electrodes 240 may be formed of an at least substantially conductive material. In one or more embodiments, the sensor electrodes 210 and sensor electrodes 240 may be formed of a substantially transparent material such as indium tin oxide (ITO) and wire mesh. In other embodiments, other substantially transparent materials may be used.

Continuing to refer to FIG. 4A, the processing system 110 coupled to the sensing electrodes includes a sensor module 250 and optionally, a display module 260. In one embodiment, the sensor module 250 comprises transmitter circuitry configured to drive a transmitter signal or a modulated signal onto and receive resulting signals with the resulting signals the sensing electrodes during periods in which input sensing is desired. The transmitter signal is generally modulated and contains one or more bursts over a period of time allocated for input sensing. The transmitter signal may have an amplitude, frequency and voltage which may be changed to obtain more robust location information of the input object in the sensing region. The modulated signal used in absolute capacitive sensing may be the same or different from the transmitter signal used in transcapacitance sensing. The sensor module 250 may be selectively coupled to one or more of the sensor electrodes. For example, the sensor module 250 may be coupled to selected portions of the sensor electrodes and operate in either an absolute or transcapacitance sensing mode. In another example, the sensor module 250 may be coupled to different sensor electrodes when operating in the absolute sensing mode than when operating in the transcapacitance sensing mode.

In various embodiments, the sensor module 250 may comprise receiver circuitry configured to receive a resulting signal with the sensing electrodes comprising effects corresponding to the transmitter signal during periods in which input sensing is desired. In one or more embodiments, the receiver circuitry is configured to drive a modulated signal onto a first sensor electrode and receive a resulting signal corresponding to the modulated signal to determine changes in absolute capacitance of the sensor electrode. The receiver circuitry may determine a position of the input object in the sensing region 120 or may provide a signal including information indicative of the resulting signal to another module or processor, for example, a determination module of the processing system 110 or a processor of the electronic device (e.g., a host processor), for determining the position of the input object in the sensing region 120. In one or more embodiments, the receiver circuitry comprises a plurality of receivers, where each receiver may be an analog front ends (AFEs).

In one embodiment, the transmitter circuitry and the receiver circuitry are part of a common microprocessor. A microprocessor includes a processing unit disposed within an integrated circuit chip. In another embodiment, the transmitter circuitry and the receiver circuitry are part of different microprocessors. Further, in one or more embodiments, a first microprocessor includes the transmitter circuitry and a first portion of the receiver circuitry, and a second microprocessor includes a second portion of the receiver circuitry.

In one or more embodiments, capacitive sensing (or input sensing) and display updating may occur during at least partially overlapping periods. For example, as a display electrode is driven for display updating, one or more sensor electrodes may also be driven for capacitive sensing. The sensor electrode may comprise the one or more display electrodes or the sensor electrode is separate from the display electrodes. Overlapping capacitive sensing and display updating may include modulating the reference voltage (s) of the display device and/or modulating at least one display electrode for a display in a time period that at least partially overlaps with when the sensor electrodes are configured for capacitive sensing. In another embodiment, capacitive sensing and display updating may occur during non-overlapping periods, also referred to as non-display update periods. In various embodiments, the non-display update periods may occur between display line update periods for two display lines of a display frame and may be at least as long in time as the display update period. In such embodiment, the non-display update period may be referred to as a long horizontal blanking period, long h-blanking period or a distributed blanking period. In other embodiments, the non-display update period may comprise horizontal blanking periods and vertical blanking periods. Processing system 110 may be configured to drive sensor electrodes for capacitive sensing during any one or more of or any combination of the different non-display update times.

The display module 260 comprises display circuitry configured to provide display image update information to the display of the display device. The display module 260 may be included with or separate from the sensor module 250. In one embodiment, the processing system 110 comprises a first integrated controller comprising the display module 260 and at least a portion of the sensor module 250 (e.g., transmitter circuitry and/or receiver circuitry). In another embodiment, the processing system 110 comprises a first integrated controller comprising the display module 260 and a second integrated controller comprising the sensor module 250. In yet another embodiment, the processing system comprises a first integrated controller and a second integrated controller. The first integrated circuit includes a display module 260 and one of a transmitter circuitry and a receiver circuitry. The second integrated controller includes the other one of the transmitter circuitry and receiver circuitry.

In one embodiment, the display module 260 includes source drivers configured to drive source electrodes (or source lines) of a display to update a display screen. The source drivers include one or more amplifiers coupled to a respective source electrode.

In the first mode of operation, at least one sensor electrode may be utilized to detect the presence of an input object via absolute sensing techniques. The sensor module 250 is configured to drive a sensor electrode using a routing trace 280 with a modulated signal (i.e., a capacitive sensing signal) and measure a capacitance between the sensor electrode and the input object (e.g., free space or earth ground) based on the modulated signal, which is utilized by the processing system 110 or another processor to determine positional information of the input object. In the second mode of operation, at least two sensor electrodes are utilized to detect presence of an input object using transcapacitive sensing techniques. The sensor module 250 is configured to drive a sensor electrode 240 using a routing trace 280 with a transmitter signal and receive a resulting signal from a sensor electrode 210 using a routing trace 2780. The resulting signal is measured to determine a change in capacitance between the sensor electrodes 240 and 210, which is utilized by the processing system 110 or another processor to determine the position of the input object.

In the embodiment illustrated in FIG. 4A, each routing trace 280 is routed to a common side of input device 100. As illustrated, one or more of the routing traces coupled to sensor electrodes 210 are routed between adjacent ones of sensor electrodes 210. Such embodiments allow sensor electrodes 210 to be disposed closer to the edges of input device 100, as the edges of the input device 100 are not needed for the routing of the routing traces. In one or more embodiments, the sensor electrodes 210 and routing traces 280 may be routed on a common layer. In another embodiment, the routing traces 280 are disposed on a first layer and the sensor electrodes 210 are disposed on a second layer above the second layer. One or more vias may be used to couple each sensor electrode with a corresponding routing trace. In one embodiment, the first and second layers may be different sides of a common substrate. In another embodiment, the first and second layers include different substrates. Further, one or more of the routing traces 280 may be aligned with a black mask layer of a display. In various embodiments, utilizing spatial encoded sensor electrodes simplifies the manufacturing process of a capacitive sensing device as it provides a sensor electrode pattern that is free of vias and jumpers, which can increase the cost and complexity of manufacturing the capacitive sensing device.

Further, the routing traces coupled to sensor electrodes 210 may be disposed on a different layer from the routing traces coupled to sensor electrode 240. For example, the routing traces coupled to sensor electrodes 240 may be disposed within a first metal layer of a display and the routing traces coupled to sensor electrodes 210 may be disposed on a color filter glass, a polarizer, or a lens of a display or a substrate external to the display.

As illustrated in FIG. 4A, each aperture 220 of sensor electrodes 210 in each row is aligned with one of the transmitter electrodes 240 in the same row. In one or more embodiment, more than one aperture of a sensor electrode 210 may be aligned with the same transmitter electrode 240. Further, each aperture 220 provides localized areas of capacitive coupling within each sensor electrode 210 between the sensor electrode 210 and a sensor electrode 240 that may be affected by an input object and measured by the determination module 270. For example, each aperture 220 provides an area where electric field lines from a driven sensor electrode 240 terminate in a sensor electrode 210 operated as a receiver electrode.

The apertures may be disposed such that an input object (e.g., input object 140) interacts with more than one aperture when it is proximate the capacitive sensing device. Further, the size and/or shape of the sensor electrodes 210 and the size, shape, and location of the apertures be configured such than the location of an input object within each sensor electrode may be determined.

Figure 4B:
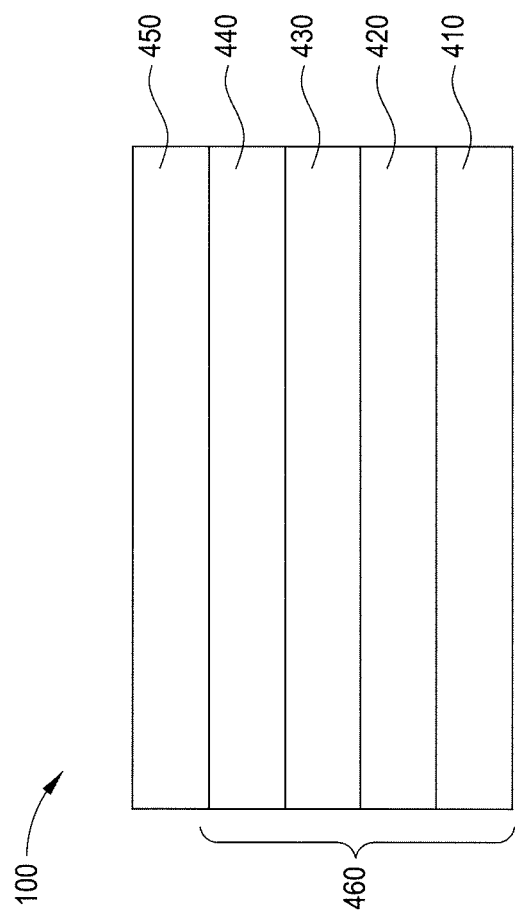

FIG. 4B illustrates a partial stackup of input device 100 including layers 410-440 of display device 460 and layer 450 disposed over display device 460. In various embodiments, one or more layers 410-450 may be omitted. In one embodiment, display device 460 includes an integrated capacitive sensing device, where one or more electrodes of the display device 460 are utilized for both capacitive sensing and display updating. For example, layer 410 may include the common voltage electrode (Vcom electrode) of the display device 460. The common voltage electrode may be segmented into multiple segments which may be utilized to form sensor electrodes 240. Further, layer 420 may be the display material of a display device 460. In one embodiment, the layer 420 may be a liquid crystal material of a liquid crystal display (LCD) device or the emissive layer of organic light emitting diode (OLED) display. Layer 430 may be the color filter glass, and layer 440 may be a lens of the display device 460. In one embodiment, sensor electrodes 210 may be disposed on one of the color filter glass (layer 430) and the lens or cover glass (layer 440). Alternatively, sensor electrodes 210 may be disposed on a substrate (layer 450) which is external to display device 460. In one embodiment, the substrate of layer 450 is adhered to the lens of layer 440.

In another embodiment, sensor electrodes 210, 240 are configured to interface with a display device of input device 100. In such an embodiment, the sensor electrodes 210, 240 are separate from the display electrodes of the display device 460. With further reference to FIG. 4B, the sensor electrodes 210, 240 may be disposed on one or more of layers 430-450. For example, sensor electrodes 240 may be disposed on a first side of the color filter glass (layer 430), and sensor electrodes 210 may be disposed on a second side of the color filter glass, the lens (layer 440) or a substrate (layer 450) external to the display device 460. Alternatively, sensor electrodes 240 may be disposed on a first side of the lens (layer 440), and sensor electrodes 210 may be disposed on a second side of the lens (layer 440), or a substrate (layer 450) external to the display device 460. Further, sensor electrodes 240 may be disposed on a first side of a substrate (layer 450) external to the display device 460, and sensor electrodes 210 may be disposed on a second side of the same substrate or on another substrate external to display device 460.

In some embodiments, layers 430 and/or 440 may additionally include one or more polarizers of display device 460. In such embodiments, sensor electrodes 210 and/or sensor electrodes 240 may be disposed on one or more of the polarizers. Further, in one or more embodiments, layers 430 and/or 440 may additionally include one or more substrates on which one or more of sensor electrodes 210, 240 are be disposed.

Further, sensor electrodes 210 and/or sensor electrodes 240 may be referred to as discrete sensor electrodes when they are disposed on one of layers 430-450.

FIGS. 5A and 5B illustrate a partial side view of sensor electrode 210a, apertures 220a and 220b, and sensor electrodes 240a and 240b. Further, FIG. 5A illustrates electric field lines 510 and 520, and FIG. 5B illustrates electric field lines 530 and 520. As illustrated in FIG. 5A, electric field lines 510 originate from sensor electrode 240a operated as a transmitter electrode and terminate at sensor electrode 210a operated as a receiver electrode, and electric field lines 520 originate at sensor electrode 240b operated as a transmitter electrode and terminate at electrode 210a operated as a receiver electrode. The electric field lines form localized areas of capacitive coupling between the sensor electrode 210a and sensor electrodes 240a and 240b.

In FIG. 5B, a portion of the electric field lines 530 terminate in input object 140 instead of sensor electrode 210a reducing the capacitive coupling between the sensor electrode 210a and sensor electrode 240a. In one embodiment, a resulting signal received by sensor electrode 210a is measured by processing system 110 to determine a reduction in the capacitive coupling between the sensor electrodes which may be used to determine positional information for the input object 140. In various embodiments, input object 140 overlaps more than one aperture at a time, affecting the electric field lines between more than one transmitter electrode and a receiver electrode With further reference to FIG. 4A, each of the sensor electrodes 210 overlaps at least one set of sensor electrodes 240. Further, each sensor electrode 210 in a common row overlaps the same sets of sensor electrodes 240. For example, sensor electrodes 210a, 210b, 210c overlap a first and second set of sensor electrodes 240 (e.g., $240_{K1}$ and $240_{K2}$). Sensor electrode sets $240_{K1}$ and $240_{K2}$ may be the same size or different in size. Additionally, each sensor electrode 210 in a common column overlaps different sets of sensor electrodes 240. For example, sensor electrode 210a and sensor electrode 210d overlap different sets of transmitter electrodes 240. In one embodiment, driving each of the sensor electrodes of sensor electrode sets 240$_{K1}$ and 240$_{K2}$ simultaneously with transmitter signals based on different codes. The transmitter signals may be applied to the sensor electrodes of electrode sets 240$_{K1}$ and 240$_{K2}$ such that the transmitter signals driven onto the sensor electrodes are based on bitwise complementary PN codes and cancel electromagnetic interference (EMI).

In other embodiments, one or more sensor electrodes 210 may overlap at least one of sensor electrode 240 that is different than another other sensor electrode of the same row. Further, in one or more embodiments, at least two sensor electrodes 210 in a common column may overlap at least one sensor electrode 240 in common.

FIG. 4A illustrates M×N first sensor electrodes (e.g., sensor electrodes 210), and J×K×M second sensor electrodes (e.g., sensor electrodes 240). M×N first sensor electrodes may be referred to as first sensor channels or, when used as receiver electrodes, receiver channels. J×K×M second sensor electrodes may be referred to as second sensor channels or, when used as transmitter electrodes, transmitter channel. Further, the number of touch sensing nodes is J×K×M×N, and the number of hover sensing nodes is N×M. The hover sensing nodes are configured to detect input objects in a first portion of sensing region 120, and the touch sensing nodes are configured to detect input objects in a second portion of sensing region 120, where the second portion extends from an input surface of input device 100 to the first portion of the sensing region 120.

In one example, for J=2 (e.g., the number of sets of sensor electrodes 240J is 2), K=7 (e.g., the number of sensor electrodes in each set of sensor electrodes 240J is 7, M=9 (e.g., the number of rows of sensor electrodes 210 and the number of groups of sensor electrodes 240 is 9), and N=5 (e.g., the number of columns of sensor electrodes 210 is 7), the number of touch sensing nodes is 630 or 18 touch sensing nodes by 35 touch sensing nodes. Further, the number of hover sensing nodes is 45. In other embodiments, the number of touch sensing nodes may be less than or greater than 630 and the number of hover sensing nodes may be less than or greater than 45. In various embodiments, the number of touch sensing nodes is based on a desired size of an input object to be detected in the second portion of the sensing region 120 and the number of hover sensing nodes is based on a desired size of an input object to be detected in the first portion of the sensing region 120 and a distance that the first portion extends from the sensing surface of the input device 100.

In one or more embodiments, to ensure that sensor electrodes 210 are at least substantially equilateral, the 'K' sensor electrodes 240 are repeated 'J' times. Further, in embodiments where each set of sensor electrodes 240 are driven sequentially there are J×K total sensing bursts. Further, in one or more embodiments, the size of sensor electrodes 210 is based on a sensor pitch of J×K.

In various embodiments, the variables 'J', 'K', 'M', and 'N' may be determined based on one or more parameters of the input device. For example, variables 'J' and 'K' may be based on at least one of the sensing time budget or burst count available and one or more of the size parameters of sensor electrodes 210. In one or more embodiments, the variables 'J' and 'L' may be determined based on hover detection height. For example, increasing 'J' and 'L', increases the size of sensor electrodes 210, increasing the hover detection distance of the sensor electrodes 210. The hover detection distance corresponds to a distance the sensor electrodes 210 are able to detect an input object from the input surface of the input device 100. In one embodiment, the hover detection distance corresponds to the distance the sensing region 120 extends from the input surface of the input device 100. Further, variables 'N' and 'M' may be determined based on the available amount of receiver circuitry within processing system 110.

In one embodiment, processing system 110 is configured to drive each of sensor electrodes 210 with an absolute capacitive sensing signal to determine changes in absolute capacitance for each of the sensor electrodes to detect input objects in a first portion of the sensing region. For example, sensor module 250 of processing system 110 is configured to drive each sensor electrode 210 with an absolute capacitive sensing signal. In one embodiment, processing system 110 may simultaneously drive two or more of the sensor electrodes 210 with an absolute capacitive sensing signal, or drive each of the sensor electrodes 210 on a one at a time basis. In other embodiments, processing system 110 may simultaneously drive each of the sensor electrodes 210 with an absolute capacitive sensing signal to simultaneously detect changes of absolute capacitance for each of the sensor electrodes 210.

Processing system 110 may be further configured to drive sensor electrodes 240 with transcapacitive sensing signals while operating sensor electrodes 210 as receiver electrodes to determine changes in transcapacitive coupling between the sensor electrodes. For example, sensor module 250 or processing system 110 may be configured to drive sensor electrodes 240 with transcapacitive sensing signals while operating sensor electrodes 210 as receiver electrodes to detect changes in transcapacitive coupling between the sensor electrodes. In one embodiment, processing system 110 is configured to simultaneously drive one or more of sensor electrodes 240 with transmitter signals while simultaneously operating one or more of sensor electrodes 210 as receiver electrodes. For example, the processing system 110 is configured to drive each sensor electrode in a set 240$_{K1}$ with a different one of a plurality of transmitter signals, where the transmitter signals are based on one or more codes. In one embodiment, each transmitter signal comprises a carrier signal that is modulated according to the codes. In other embodiments, each sensor electrode of sensor electrodes 240 is driven one at a time.

Sensor module 250 of processing system 110 receives resulting signals with each sensor electrode 210, where the resulting signals comprise effects corresponding to the transmitter signal. The determination module 270 of the processing system 110 may filter and process the resulting signals to determine the changes in transcapacitive coupling between sensor electrodes. In one embodiment, the determination module 270 processes the resulting signals to determine changes in capacitive coupling between the sensor electrodes. Processing the resulting signals may include removing a baseline from resulting signals, filtering the resulting signals and demodulating the resulting signal based on the transmitter signal, to determine changes in capacitive coupling between sensor electrodes 210 and 240. In one embodiment, as an input object affects the coupling between sensor electrodes 210 and 240 in areas of sensor electrodes 210 comprising apertures, the apertures act to decode the resulting signals. Thus, the determination module 270 is able to process the resulting signals to determine measurements of changes in transcapacitance between sensor electrodes 210 and 240 without decoding the resulting signals according to the codes used to arrange the apertures.

In one or more embodiments, the determination module 270 receives the resulting signals from the sensor module 250 and processes the resulting signals by demodulating the resulting signal according to the codes used to arrange the apertures. In one embodiment, demodulating the resulting signal according to the codes includes decoding the resulting signals according to the codes used to arrange the apertures to determine measurements of changes in transcapacitance between the sensor electrodes 210 and 240. The codes may be stored within a memory of processing system 110 and accessed by the determination module 270 to demodulate the resulting signals. In one embodiment, the determination module 270 may be configured to remove a baseline from the resulting signals before demodulating the resulting signals.

Further, the determination module 270 may be configured to determine a two dimensional capacitive image and/or positional information for an input object based on the determine measurements of changes in transcapacitance. In one embodiment, the determination module 270 is configured to communicate the determine measurements of changes in transcapacitance to another element of processing system 110 or another processor.

In one or more embodiments, the codes used to arrange the apertures may be stored within a memory of processing system 110 and accessed by determination module 270. For example, the codes may be stored using one a look up table, listing each sensor electrode 210 and their corresponding codes.

In embodiments where multiple sensor electrodes 240 are simultaneously driven with transmitter signals based on one or more codes (e.g., transmitter signal code(s)), the determination module 270 further demodulates the resulting signals according to the transmitter signal codes. For example, the determination module 270 may demodulate the resulting signals according to the codes used to arrange the apertures of sensor electrodes 210 and demodulate the resulting signals according to the codes used to generate the transmitter signal.

In one or more embodiments, the size and shape of sensor electrodes may be varied to detect input objects at various distances from an input surface of the sensing device. For example, sensor electrodes having a larger surface area may be utilized to sense input objects at a greater distance from the input surface than sensor electrodes having a smaller surface area. In one or more embodiments, sensor electrodes are designed to support detecting both touching and at a distance from the input surface with accuracy.

As illustrated in FIG. 4A, each sensor electrode of sensor electrodes 210 has a width (or a height) of L and a height (or a width) of at least J, where J corresponds to the number of sets of sensor electrodes 210, that each sensor electrode 240 overlaps, and where L is equal to length of the codes used to arrange the apertures or J. The height and width of the sensor electrodes 210 may be determined according to a sensing distance. For example, enlarging the sensor electrodes 210 increases the distance that the sensor electrodes are able to detect an input object. In one embodiment, the size of at least one of sensor electrodes 210 differs from that of another one of sensor electrodes 210. Further, in one or more embodiments, each sensor electrode 240 may have a common width and height, or at least one sensor electrode of sensor electrodes 240 may be greater in at least one of a width and a height than another one of sensor electrodes 240. In one example embodiment, sensor electrode 210$c$ has a height, J, of about 11 mm and a width, L, of about 39 mm. The height and width may correspond to a sensor pitch of the sensor electrodes. For example, a nominal sensor pitch may be set to K*(width of 240)=5.6 mm, thus the sensor electrode 210$c$ has a height of J×5.6=11.2 mm and a width of K×5.6 39.2, where K is equal to the number of sensor electrodes 240 in each set. In other embodiments other heights and widths may be utilized. Further, in various embodiments, the width of each sensor electrode 240 may be about 0.30 mm to about 0.80 mm.

In one or more embodiments, first sensor electrodes are disposed in a coarsely pitched arrangement and second sensor electrodes are disposed in a finely pitched arrangement. Further, the first sensor electrodes may be spatially encoded according to one or more patterns. In one embodiment, each of the first sensor electrodes comprises apertures disposed according to the one or more patterns. The coarsely pitched and spatially encoded sensor electrodes provide an increased sensing distance and ability to detect smaller input objects as compared to coarsely pitched sensor electrodes that are not spatially encoded. Further, the spatially encoded sensor electrodes are less likely to be affected by the low-ground mass phenomenon as compared to non-spatially encoded sensor electrodes, as the spatially encoded sensor electrodes reduces the likelihood that charge will be coupled back into the sensor electrodes through an input object.

In one embodiment, increasing the size of sensor electrodes 210 increases the distance at which those sensor electrodes are able to detect an input object, and decreasing the size of sensor electrodes 240 and spatially encoding the sensor electrodes 210 allow for the sensing of smaller input objects. Further, the sensor electrodes 210 are disposed in a coarsely pitched arrangement as compared to the sensor electrodes 240 which are disposed in a finely pitched arrangement. In one embodiment, the size and pitch of sensor electrodes 210 are based on a sensing distance, and the size and pitch of sensor electrode 240 are based on a size of an input object to be sensed. For example, by increasing at least one of the size and pitch of sensor electrodes 210, the sensing distance of sensor electrodes 210 may be increased, and by decreasing at least one of the size and pitch of sensor electrodes 240 and spatially encoding the sensor electrodes 210, smaller input objects may be detected. In one embodiment, the size and pitch of sensor electrodes 210 and 240 and the spatially encoding of sensor electrodes 210 are selected to detect input objects that are at least 2 mm from an input surface of input device 100 and input objects that have a width of at least 5 mm. In other embodiments, the size and pitch of sensor electrodes 210 and 240 and the spatially encoding of sensor electrodes 210 may be selected to sense input objects further away from or closer to the sensing surface than 2 mm and input objects that are either smaller or larger than 5 mm. In one embodiment, the transcapacitive sensing pitch is 5 mm by 5 mm and the absolute capacitive sensing pitch is 15 mm by 20 mm. In other embodiments, other pitches may be used.

Figure 6:
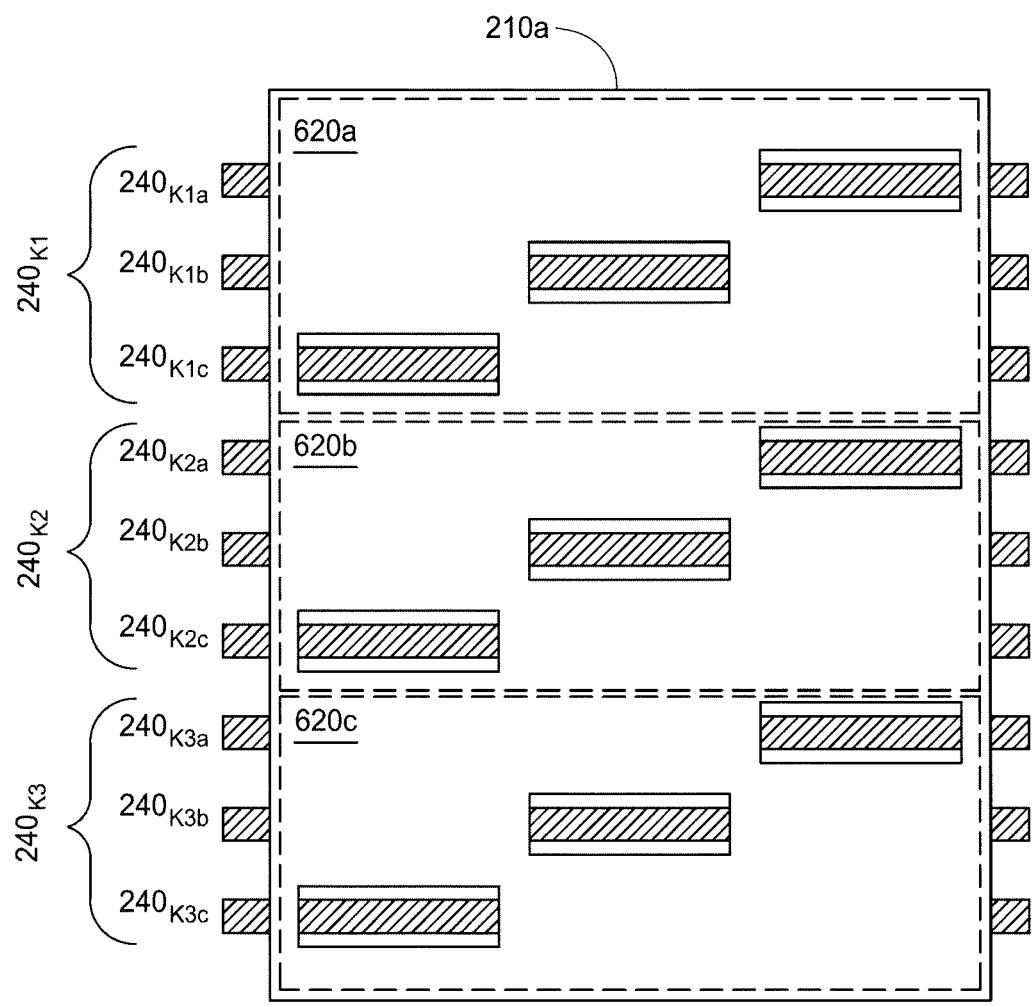
FIGS. 6 and 7 illustrate spatially encoded sensor electrodes according to one or more embodiments.

FIG. 6 illustrates an alternative embodiment of sensor electrode 210$a$ comprising three separate sets of apertures, aperture set 620$a$, 620$b$ and 620$c$, and sets 240$_{K1}$, 240$_{K2}$, and 240$_{K3}$ of sensor electrodes 240. Sets 240$_{K1}$, 240$_{K2}$, and 240$_{K3}$ may similar or different from those of 240$_{K1}$, and 240$_{K2}$ of FIG. 4A. As illustrated, sensor electrode 210$a$ shaped in a large rectangle or block overlaps three sets of sensor electrodes 240, each electrode 240 shaped in a stripe or bar and arranged in parallel to each other. Stripe-shaped sensor electrodes 240 may be considered skinny, while the large block sensor electrode 210$a$ may be bulky.

As illustrated in FIG. 6, the sensor electrode 210$a$ comprises aperture sets 620$a$-620$c$, each set comprising three apertures. In other embodiment, the sensor electrode 210$a$ may include more or less aperture sets, and the aperture sets may include more than or less than three apertures. Further, the apertures of set 620*a* are aligned with transmitter electrodes 240$_{K1a}$-240$_{K1c}$, the apertures of set 620*b* are aligned with transmitter electrodes 240$_{K2a}$-240$_{K2c}$, and the apertures of set 620*c* are aligned with transmitter electrodes 240$_{K3a}$-240$_{K3c}$. As illustrated, each set of sensor electrodes 240$_{K1}$, 240$_{K2}$, and 240$_{K3}$ includes the same number of sensor electrodes 240. In other embodiments, one or more the sets may have a different number of sensor electrodes 240 than another set.

In one embodiment, the apertures of sets 620*a*, 620*b* and 620*c* may be disposed according to codes. The codes may be binary codes, comprising first and second coefficients, and the location of each of the apertures corresponds to the location of first coefficients within the codes. In other embodiments, the codes may be m-ary, comprising more than two coefficients.

As illustrated in FIG. 6, apertures of set 620*a* corresponds to first codes and at least one of the apertures of sets 620*b* and 620*c* are disposed to a second set of codes different from the first codes. In yet other embodiments, the apertures of set 620*a* are disposed according to a first sets of codes, the apertures of set 620*b* are disposed according to a second set codes, and the apertures of set 620*c* are disposed according a second set codes, where the first set of codes, the second set of codes and the third set of codes are different from each other. In one embodiment, the length of the codes used to determine the arrangement of the apertures corresponds to the number of sensor electrodes in each set of sensor electrodes 240.

In one embodiment, processing system 110 is communicatively coupled to sensor electrodes 240$_{K1}$, 240$_{K2}$, and 240$_{K3}$ and sensor electrode 210*a*. In a first mode of operating, sensor module 250 of processing system 110 is configured to drive absolute capacitive sensing signal onto and receive a first resulting signal from sensor electrode 210*a* to determine a measurement of absolute capacitance for the sensor electrode 210*a*. The measurement of absolute capacitance may be used to detect input objects in a first portion of the sensing region. In one or more embodiment, the sensor electrodes 240 are driven with a guarding signal while the sensor electrodes 210 are driven for absolute capacitive sensing. The guarding signal is similar to the absolute capacitive sensing signal in at least one of phase and amplitude.

In one embodiment, the sensor module 250 drives sensor electrodes 240 with absolute capacitive sensor signals to detect changes in an absolute capacitive coupling for the sensor electrodes 240. A change in capacitive coupling may be detected for each sensor electrode 240 or one or more of sensor electrodes 240 may be grouped together to detect a change in capacitive coupling for a group of sensor electrodes 240.

In a second mode of operation the processing system 110 is configured to drive sensor electrodes 240$_{K1}$, 240$_{K2}$, and 240$_{K3}$ with a transcapacitive sensing signal and receive resulting signals with sensor electrode 210*a* to determine measurements of transcapacitance between sensor electrode 210*a* and sensor electrodes 240$_{K1}$, 240$_{K2}$, and 240$_{K3}$. The measurements of transcapacitance may be used to detect input objects in a second portion of the sensing region.

When an input object is positioned proximate an aperture, the input object reduces the capacitive couple between a driven sensor electrode 240 and sensor electrode 210*a*, and this change in capacitive coupling is reflected within the resulting signals. Demodulating the transcapacitive resulting signals according to the codes used to dispose the apertures makes it possible to determine where within sensor electrode 210*a*, an input object is located.

The resulting signals are decoded according to the pattern used to dispose the apertures. In one embodiment, determination module 270 processes the resulting signals to determine positional information for one or more input objects. In another embodiment, the determination module 270 demodulates the resulting signals by decoding the resulting signals based on the codes used to arrange the apertures.

With reference to FIG. 6, where the apertures of sets 620*a*-620*c* are disposed according to the codes $$\begin{bmatrix} 1 & 1 & 0 \\ 1 & 0 & 1 \\ 0 & 1 & 1 \end{bmatrix},$$

the determination module 270 may be configured to decode each resulting signal according to the codes to determine changes in the transcapacitive coupling between sensor electrodes 210 and 240 to determine positional information for an input object.

In one embodiment, sensor module 250 simultaneously drives each sensor electrode of set of sensor electrodes with one of a plurality of transmitter signals based on one or more codes (i.e., transmitter codes). The same transmitter signals may be applied to each set of sensor electrodes 240, or different transmitter signals may be driven onto each set of sensor electrodes. For example, a first transmitter signal may be driven onto sensor electrodes 240$_{K1a}$, 240$_{K2a}$, and 240$_{K3a}$, a second transmitter signal may be driven onto sensor electrodes 240$_{K1b}$, 240$_{K2b}$, and 240$_{K3b}$, and a third transmitter signal may be driven onto sensor electrodes 240$_{K1c}$, 240$_{K2c}$, and 240$_{K3c}$. The first, second and third transmitter signals are based on different codes. Further, each sensor electrode of set 240$_{K1}$ may be simultaneously driven with the first, second and third transmitter signals during a first period, each sensor electrode of set 240$_{K2}$ may be simultaneously driven with the first, second and third transmitter signals during a second period, and each sensor electrode of set 240$_{K3}$ may be simultaneously driven with the first, second and third transmitter signals during a third period.

In another embodiment, first, second and third transmitter signals are driven onto 240$_{K1a}$, 240$_{K2a}$ and 240$_{K3a}$, fourth, fifth and sixth transmitter signals are driven onto 240$_{K1b}$, 240$_{K2b}$ and 240$_{K3b}$, and seventh, eighth, and ninth transmitter signals are driven onto 240$_{K1c}$, 240$_{K2c}$ and 240$_{K3c}$. The first through ninth transmitter signals are each based on different codes, and each sensor electrode of set 240$_{K1}$, 240$_{K2}$, and 240$_{K3}$ may be simultaneously driven based on the transmitter signals.

In embodiments where the sensor electrodes 240 are driven with transmitter signals based on codes, the resulting signals are further decoded by determination module 270 with those codes. For example, a first transmitter signal is based on a first code of [1–1 1], the second transmitter signal is based on a second code of [1 1–1], and the third transmitter signal is based on a third code of [–1 1 1], the resulting signals are demodulated based on both the codes used to arrange the apertures and also the codes used to determine the transmitter signals.

In one embodiment, the first, second, and third codes used to determine the transmitter signals may be represented within a matrix $$\begin{bmatrix} 1 & -1 & 1 \\ 1 & 1 & -1 \\ -1 & 1 & 1 \end{bmatrix}.$$

Combining the codes used to arrange the apertures, $$\begin{bmatrix} 1 & 1 & 0 \\ 1 & 0 & 1 \\ 0 & 1 & 1 \end{bmatrix},$$

and the codes used to determine the transmitter signals, the following identify matrix is achieved, $$\begin{bmatrix} 2 & 0 & 0 \\ 0 & 2 & 0 \\ 0 & 0 & 2 \end{bmatrix}.$$

In such an embodiment, the determination module 270 may process the resulting signals to determine positional information of one or more input objects without decoding the resulting signals according to the codes as the aperture pattern within each sensor electrode combined with the codes used to generate the transmitter signals generate an identify matrix when utilized together.

Figure 7:
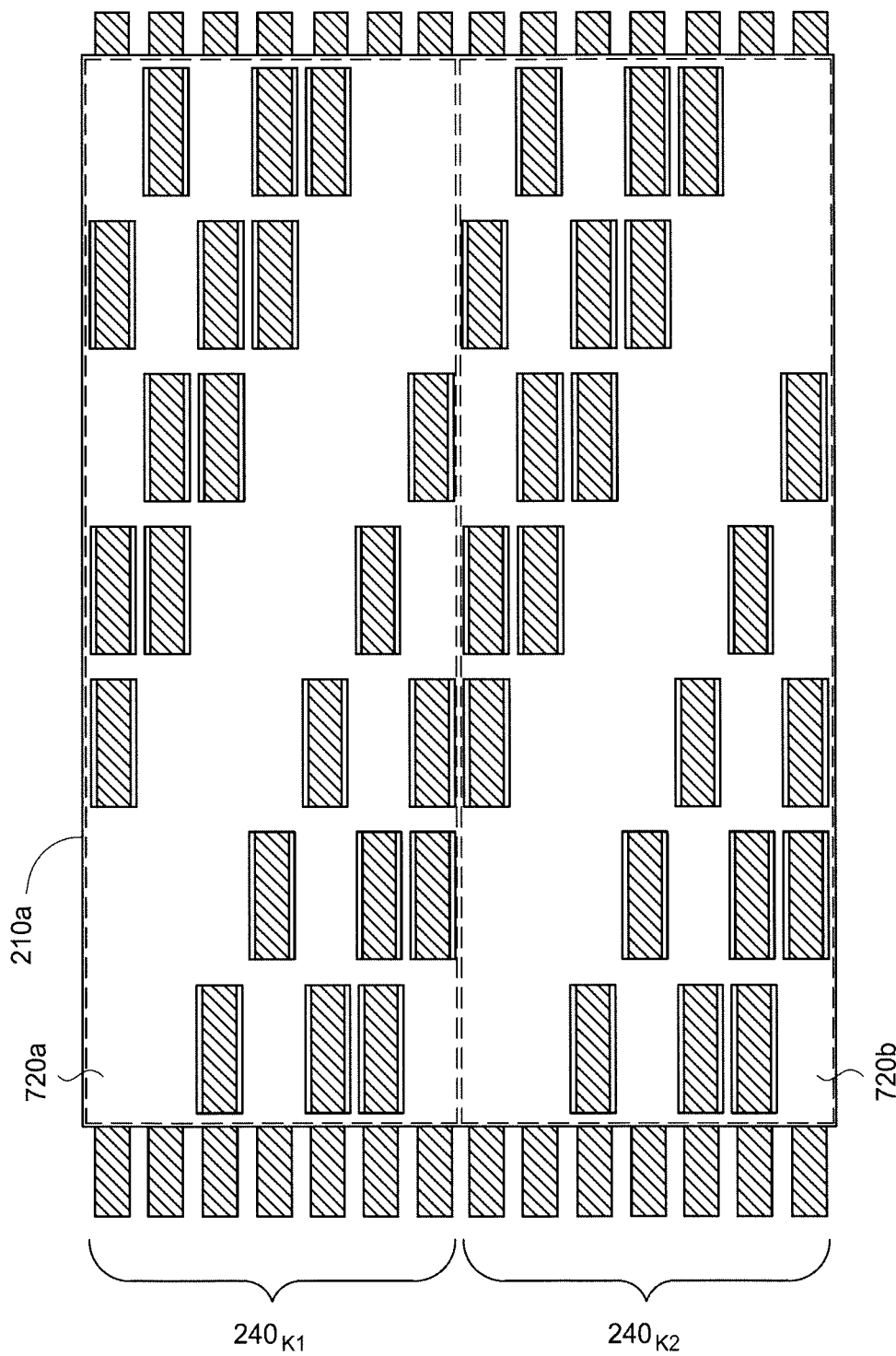

FIG. 7 illustrates another embodiment of sensor electrode 210*a* having aperture sets 720*a* and 720*b*, and sensor electrodes 240 forming sets 240$_{K1}$ and 240$_{K2}$. As illustrated, 240$_{K1}$ and 240$_{K2}$ each include 7 sensor electrodes. Accordingly, the apertures of aperture sets 720*a* and 720*b* are disposed according to a code having a length of 7. Further, in embodiments, where more than one sensor electrode 240 is simultaneously driven, the code length used to determine the transmitter signals is at least 7. In the illustrated embodiment, the apertures and conductive portions of sensor electrode 210 are disposed according to codes:

$$\begin{bmatrix} 1 & 1 & 0 & 0 & 1 & 0 & 1 \\ 1 & 1 & 1 & 0 & 0 & 1 & 0 \\ 0 & 1 & 1 & 1 & 0 & 0 & 1 \\ 1 & 0 & 1 & 1 & 1 & 0 & 0 \\ 0 & 1 & 0 & 1 & 1 & 1 & 0 \\ 0 & 0 & 1 & 0 & 1 & 1 & 1 \\ 1 & 0 & 0 & 1 & 0 & 1 & 1 \end{bmatrix}.$$

Further, in one example embodiment, where each sensor electrode of set 240K1 are simultaneously driven with transmitter signals during a first period and each sensor electrode of set 240K2 are simultaneously driven with the transmitter signals during a second period, the transmitter signals may be based the following codes:

$$\begin{bmatrix} 1 & 1 & -1 & 1 & -1 & -1 & 1 \\ 1 & 1 & 1 & -1 & 1 & -1 & -1 \\ -1 & 1 & 1 & 1 & -1 & 1 & -1 \\ -1 & -1 & 1 & 1 & 1 & -1 & 1 \\ 1 & -1 & -1 & 1 & 1 & 1 & -1 \\ -1 & 1 & -1 & -1 & 1 & 1 & 1 \\ 1 & -1 & 1 & -1 & -1 & 1 & 1 \end{bmatrix}.$$

In one embodiment, sensor module 250 drives the sensor electrodes 240$_{K1}$ with transmitter signals based on the codes and receives a first resulting signal with a sensor electrode 210*a* during a first period and drives the sensor electrodes 240$_{K2}$ with transmitter signals based on the codes and receives a second resulting signal with a sensor electrode 210*a* during a second period that does not overlap with the first period. Determination module 270 processes the first and second resulting signals to determine a measurement of a transcapacitive coupling between each sensor electrode 240 and sensor electrode 210*a*. In one embodiment, processing the first and second resulting signals comprises removing a baseline from the first and second resulting signals and decoding the first and second resulting signals according to the codes describing the arrangement of the apertures and/or the codes used to generate the transmitter signals driven onto the sensor electrodes 240 for transcapacitive sensing.

In the embodiment of FIG. 7, the touch sensing pitch is about 5 mm by about 5 mm and the hover sensing pitch is about 35 mm by 10 mm. In other embodiments, other pitch sizes may be utilized. For example, the transcapacitive sensing pitch may be from about 4 mm by about 4 mm to about 7 mm by about 7 mm, and the absolute capacitive sensing pitch may be from about 4 mm by about 30 mm to about 6 mm by about 70 mm.

While the above embodiments illustrate code lengths of 3 and 7, in other embodiments, other code lengths may be used. For example, a code length of 11 and 15 may be used. Further, code lengths greater than 15 may also be used.

Figure 8A:
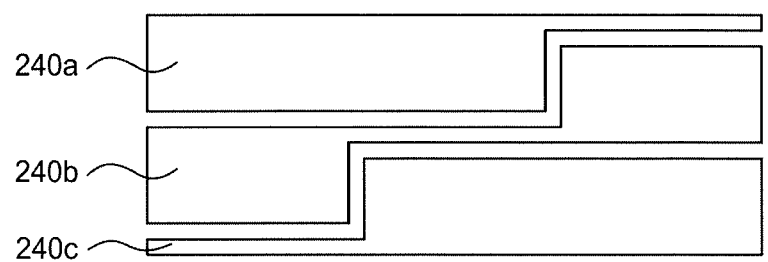
FIGS. 8A and 8B illustrate spatially encoded sensor electrodes according to one or more embodiments.
Figure 8B:
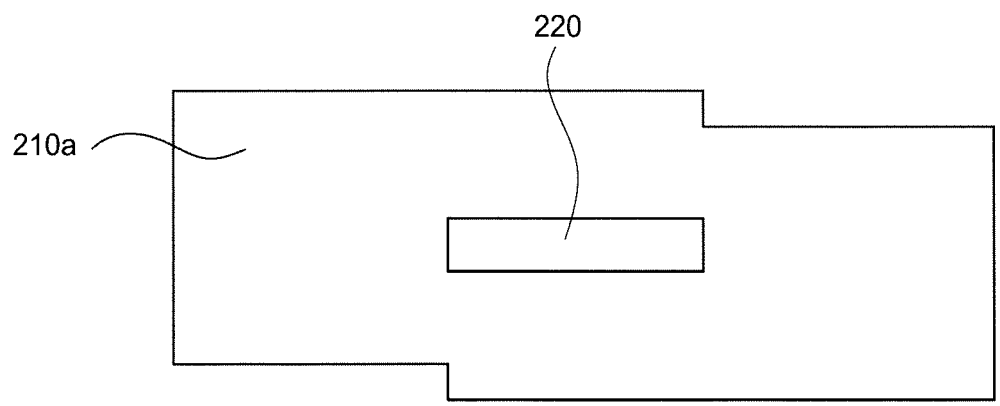

FIGS. 8A and 8B illustrate another embodiment of sensor electrodes 210 and 240. As illustrated in FIG. 8A, sensor electrodes 240*a*-240*c* are disposed according to the spatial patterning applied to sensor electrode 210*a* of FIG. 8B. For example, sensor electrodes 240*a*, 240*b* and 240*c* each have a narrow region according to where an aperture 220 is formed in sensor electrode 210. In one embodiment, the narrow regions of sensor electrodes 240*a*-240*c* are overlayed by portions of sensor electrode 210*a*. Such a configuration maximizes the aperture area, increasing the signal gain and spatial uniformity of the sensor electrodes.

Figure 9A:
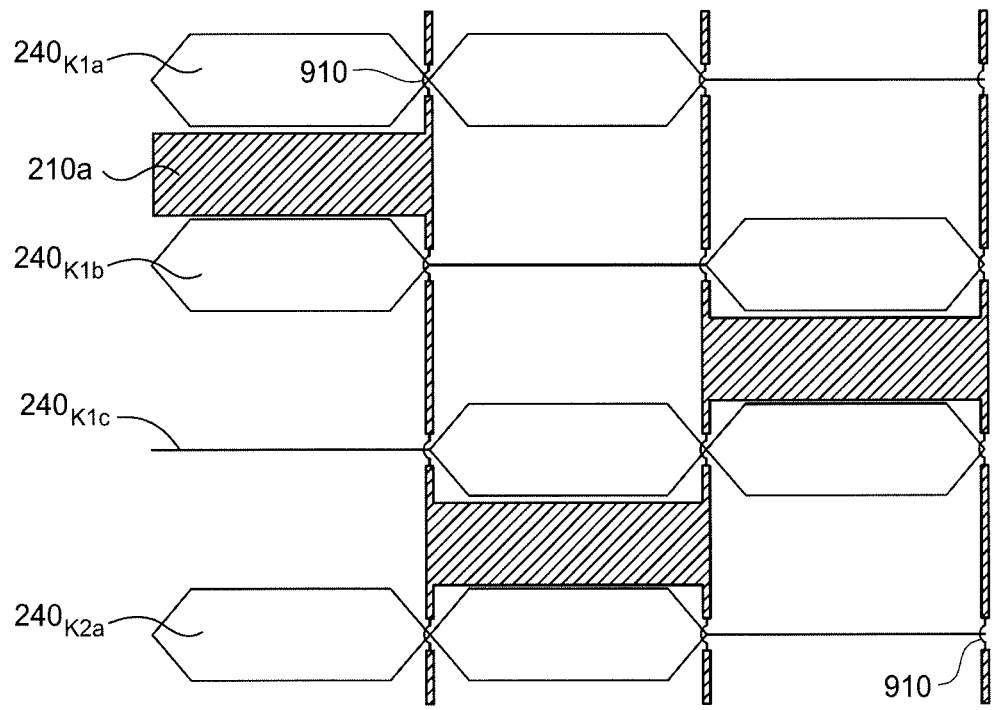
FIGS. 9A and 9B illustrate spatially encoded sensor electrodes according to one or more embodiments.
Figure 9B:
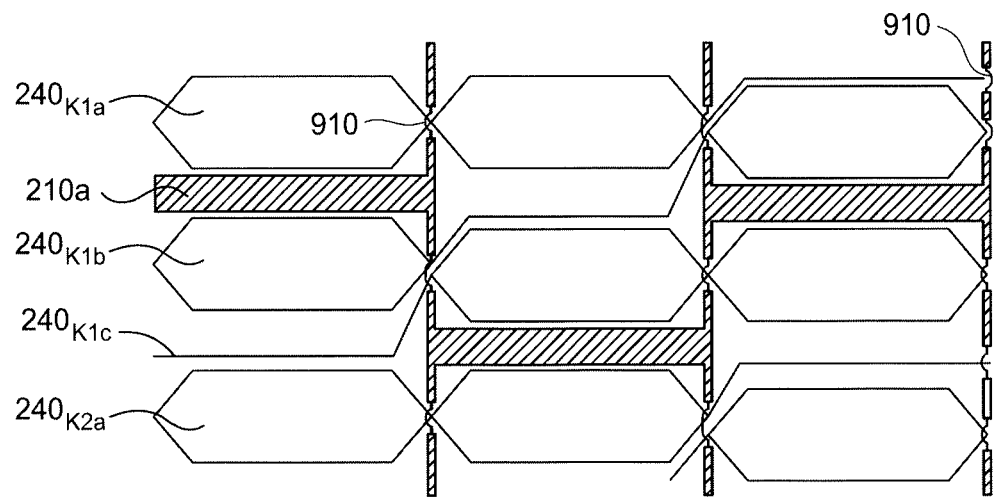

FIGS. 9A and 9B illustrate an alternative embodiment for sensor electrodes 210 and 240. In the illustrated embodiments, sensor electrode 210*a* includes jumpers 910 such that sensor electrode 210*a* and 240$_{K1a}$-240$_{K1c}$ are disposed on a common layer. Sensor electrode 210*a* includes jumpers in regions where sensor electrodes 210*a* and 240 intersect to electrically isolate the sensor electrodes form each other. The jumpers may be disposed on a separate layer from that of the sensor electrodes 210*a* and 240$_{K1a}$-240$_{K1c}$ and are coupled to sensor electrode 210*a* through vias. Further, sensor electrode 210*a* and 240$_{K1a}$-240$_{K1c}$ are patterned according to codes to control the regions of capacitive coupling between the sensor electrodes. In the illustrated embodiment, the sensor electrodes are pattern according to the codes $$\begin{bmatrix} 1 & 1 & 0 \\ 1 & 0 & 1 \\ 0 & 1 & 1 \end{bmatrix}.$$

As compared to the embodiment of FIG. 4A, in the embodiments of FIGS. 9A and 9B, a '0' coefficient corresponds to an area where sensor electrode 210a is not disposed proximate a corresponding sensor electrode 240. Further, each sensor electrode 240 comprises narrow regions according to the '0' coefficients. In the embodiment of FIG. 9B, portions of the sensor electrodes $240_{K1a}$-$240_{K1c}$ are also disposed in an offset position according to '0' coefficients in the code.

Figure 10:
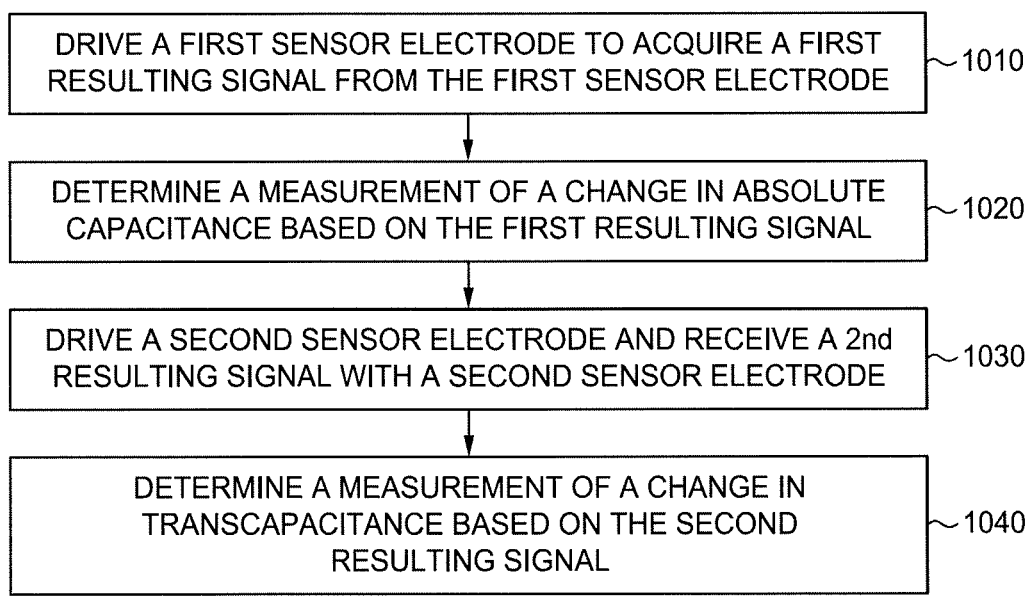
FIG. 10 illustrates a method of detecting input objects according to one or more embodiments.

FIG. 10 is a flowchart illustrated method 1000 for determining positional information for an input object. While various steps are illustrated in FIG. 10 in a particular order, in various embodiments, the steps may be implemented in any order. Further, in one or more embodiments, one or more of the steps may be excluded.

At step 1010, a first sensor electrode is driven to acquire a first resulting signal from the first sensor electrode. In one embodiment, processing system 110 is configured to drive the first sensor electrode with a modulated signal (absolute capacitance sensing signal) and receive a resulting signal from the first sensor electrode. For example, the first sensor electrode is coupled to sensor module 250, and the sensor module 250 is configured to drive the first sensor electrode with a modulated signal and receive a resulting signal from the first sensor electrode. In one embodiment, the sensor module 250 includes receiver circuitry configured to drive the modulated signal onto and receive the resulting signal from the first sensor electrode. In another embodiment, the sensor module 250 includes transmitter circuitry configured to drive the sensor electrode with the modulated signal and receiver circuitry configured to receive a resulting signal from the sensor electrode. Further, more than two sensor electrodes may be simultaneously driven and received with to acquire a respective resulting signal from each of the sensor electrodes. For example, the sensor module 250 is configured to simultaneously drive each of sensor electrodes 210 with a modulated signal while receiving resulting signals from each of the sensor electrodes 210.

At step 1020, a measurement of a change in absolute capacitance is determined based on the first resulting signal. In one embodiment, the determination module 270 is configured to determine a measurement of the change in absolute capacitance based on the first resulting signal for the first sensor electrode. Determination module 270 processes the resulting signal with one or more filters and signal processing techniques. The determination module 270 may include one or more filters, mixers, and/or decoders that are configured to process the resulting signal to determine the measurement of the change in absolute capacitance. In one embodiment, the determination module 270 is configured to simultaneously determine a measurement of change in absolute capacitance for more than two sensor electrodes of sensor electrodes 210. Each measurement of a change in absolute capacitance corresponds to respective one of the hover sensing nodes.

In one embodiment, determination module 270 is configured to process resulting signals received from sensor electrodes 210 to determine a change in absolute capacitance for each of the sensor electrodes 210 by applying one or more filters to the resulting signals and removing a baseline from the resulting signals. Further, the determination module 270, another element within processing system 110 or another processor within input device 100 is configured to determine positional information from the changes in absolute capacitance by detecting maximum and minimum values of the changes in absolute capacitance. In one embodiment, the determination module 270, another element within processing system 110 or another processor is configured apply interpolation techniques to the values of the changes in absolute capacitance. Further, the determination module 270, another element within processing system 110 or another processor may be configured to determine a two-dimensional capacitive image based on the changes of absolute capacitance, and the image may be used to determine positional information for an input object.

At step 1030, a second sensor electrode is driven with a transmitter signal and a resulting signal is received with a first sensor electrode, the resulting signal comprising effects of the transmitter signal. In one embodiment, the sensor module 250 is configured to drive the second sensor electrode with the transmitter signal and receive the resulting signal with the first sensor electrode. In one embodiment, the sensor module 250 includes transmitter circuitry that is configured to drive one or more sensor electrodes of sensor electrodes 240 with one or more transmitter signals and receiver circuitry to receive one or more resulting signals with one or more sensor electrodes of sensor electrodes 210.

At step 1040, a measurement of a change in a transcapacitive coupling between the first and second sensor electrodes based on the second resulting signals is determined. In one embodiment, determination module 270 is configured to determine the measurement of the changes in transcapacitive coupling between sensor electrodes 210 and sensor electrode 240. For example, the determination module 270 may process the resulting signals to determine the measurements of the changes in transcapacitive coupling. In one embodiment, the determination module 270 is configured to demodulate the resulting signals according the codes used to arrange the apertures of each sensor electrode 210. In one embodiment, the determination module 270 acquires the codes from a memory within processing system 110.

In embodiments where the transmitter signals are generated based on codes, the determination module 270 is configured to demodulate the resulting signals according to the codes used to generate the transmitter signals. In such embodiment, the codes used to generate the transmitter signals may be acquired from a memory within processing system 110 or from sensor module 250. For example, with reference to FIG. 4A, the determination module 270 is configured to demodulate a resulting signal received from sensor electrode 210a and process a resulting signal received from sensor electrode 210b, to determine changes in transcapacitive coupling between sensor electrodes 210a and 210b and sensor electrodes $240_{K1}$ and $240_{K2}$. Further, the determination module 270 is configured to demodulate the resulting signal received from sensor electrode 210a and demodulate the resulting signal received from sensor electrode 210b according to the codes used to generate the transmitter signals driven on sensor electrodes $240_{K1}$ and $240_{K2}$.

In one embodiment, a measurement of a change in transcapacitance may be determined between each sensor electrode 210 and each sensor electrode 240. The each measurement of a change in transcapacitive coupling corresponds to a respective one of the touch sensing nodes of the input device 100.

Determination module 270 may be configured to change an operating mode of sensor module 250. For example, in one embodiment, determination module 270 may provide an indication to sensor module 250 to switch from operating in an absolute capacitive sensing mode to operating in a transcapacitive sensing mode when an input object is detected in a first portion of sensing region 120. Further, determination module 270 may be configured to switch from operating in a transcapacitive sensing mode to operating in an absolute sensing mode when no input object is detected in a second portion of the sensing region 120, where the second portion of the sensing region is between the first portion and an input surface of the input device 100.

In one embodiment, the determination module 270 is configured to process resulting signals received from sensor electrodes 210 when transmitter signals are transmitted with sensor electrodes 240 used as transmitter electrodes, to determine changes in transcapacitance between one or more of sensor electrodes 210 and 240 by applying one or more filters and removing a baseline from the resulting signals. Further, the determination module 270, another element within processing system 110, or another processor within input device 100 is configured to determine positional information from the changes in transcapacitance by generating a two-dimensional image from the measured changes in transcapacitive and detecting maximum and minimum values within the image. In one embodiment, the determination module 270, another element within processing system 110, or another processor is configured apply interpolation techniques to the values of the changes in transcapacitance to determine the two-dimensional image.

In one or more embodiments, the determination module 270, another element within processing system 110 or another processor within input device 100 is configured to determine positional information for one or more input object in one based on a combination of the positional information determined from the changes in absolute capacitance and the determined changes in transcapacitance.

Figure 11:
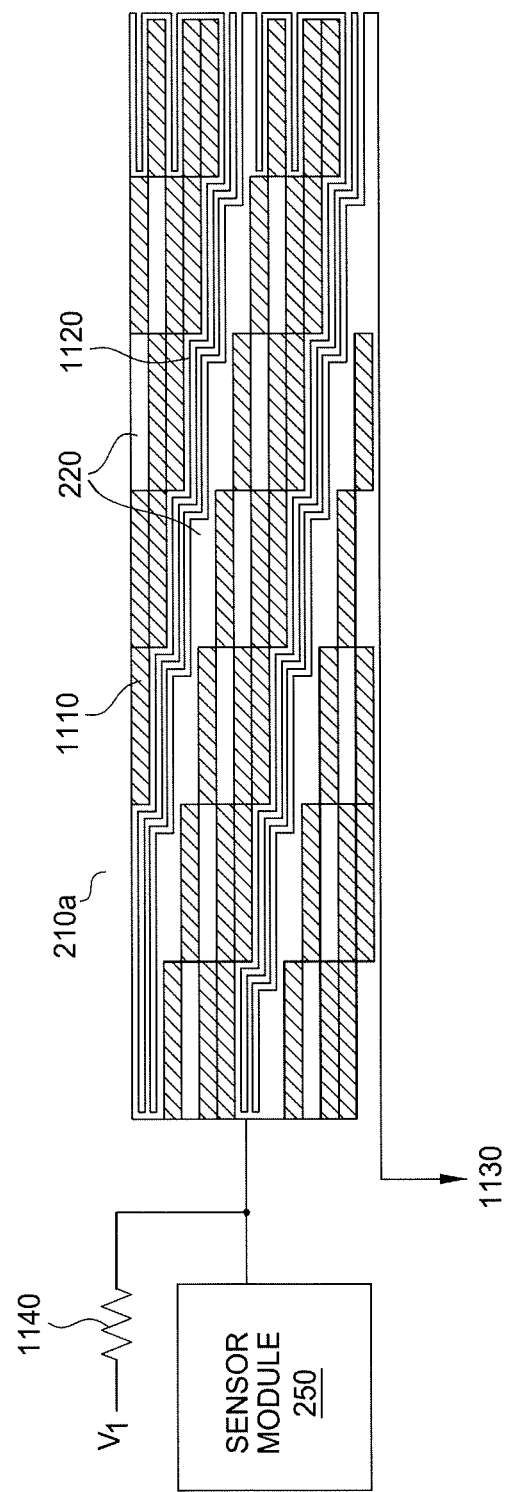
FIG. 11 illustrates a sensor electrode according to one or more embodiments.

FIG. 11 illustrates an alternative embodiment of sensor electrode 210a. In the embodiment of FIG. 11, sensor electrode 210a is configured for force sensing and includes apertures 220, conductive regions 1110 and strain gauge material 1120. As is illustrated, the strain gauge material is disposed within one or more of the apertures 220 of sensor electrode 210a. As the strain gauge material deflects, the resistance of the strain gauge material changes, changing an output current of the sensor electrode 210a. In one embodiment, an ohmic short is formed where the strain gauge material is coupled to the conductive material of the sensor electrode.

The sensor electrode 210a may be coupled to a first voltage $V_1$, sensor module 250 and a substantially constant voltage 1130. In one embodiment, in such a configuration, sensor electrode 210a form a half-bridge. Further, the substantially constant voltage 1130 may be one of a system ground or any substantially ground voltage. As is illustrated in FIG. 11, $V_1$ is coupled to the sensor electrode via resistor 1140. In one embodiment, resistor 1140 may include a discrete resistor. For example, resistor 1140 may include restive material disposed outside the active area of the input device 100. In one embodiment, resistor 1140 may be disposed on a border region of the input device 100.

Sensor electrode 210a of FIG. 11 may be driven in one or more of the sensing modes as described above and also for force sensing. For example, sensor electrode 210a of FIG. 11 may be configured to be driven in a transcapacitive sensing mode and/or an absolute capacitive sensing mode, and additionally, for force sensing. In one embodiment, in a force sensing mode, sensor electrode 210a is configured to flex in response to an applied input force, changing the resistance of the strain gauge material. Further, sensor electrode 210a may be driven with a first voltage potential, $V_1$, and coupled to substantially constant voltage 1130, and as the sensor electrode 210a is flexed, the output current received by sensor module 250 from sensor electrode 210a changes. The change in current may be measured to determine a force measurement. In one embodiment, the determination module 270 is configured to determine a measurement of an input force based on the output current.

In one embodiment, input device 100 may include one more sensor electrodes configured for force sensing as illustrated in FIG. 11. For example, each of sensor electrodes 210 may be configured for force sensing. In other embodiments, at least one of sensor electrodes 210 may be configured for force sensing.

Thus, the embodiments and examples set forth herein were presented in order to best explain the embodiments in accordance with the present technology and its particular application and to thereby enable those skilled in the art to make and use the disclosure. However, those skilled in the art will recognize that the foregoing description and examples have been presented for the purposes of illustration and example only. The description as set forth is not intended to be exhaustive or to limit the disclosure to the precise form disclosed.

In view of the foregoing, the scope of the present disclosure is determined by the claims that follow.

What is claimed is:

1. A sensing device comprising:
    a first plurality of sensor electrodes configured to be coupled to first traces; and
    a second plurality of sensor electrodes configured to be coupled to second traces, the second plurality of sensor electrodes comprising:
        a first sensor electrode overlapping a first subset of the first plurality of sensor electrodes and comprising a plurality of apertures arranged in rows according to a first set of codes and the first subset of the first plurality of sensor electrodes, wherein each aperture of a first row of the plurality of apertures is arranged according to a first row of the first set of codes and each aperture of a second row of the plurality of apertures is arranged according to a second row of the first set of codes, and wherein the first row of the first set of codes differs from the second row of the first set of codes; and
        a second sensor electrode overlapping a second subset of the first plurality of sensor electrodes, the second sensor electrode comprising a plurality of apertures disposed according to a second set of codes.

2. The sensing device of claim 1, wherein a height of the first sensor electrode of the second plurality of sensor electrodes is larger than a height of each sensor electrode of the first subset of the first plurality of sensor electrodes, and a width of the first sensor electrode is smaller than a width of each sensor electrode of the first subset.

3. The sensing device of claim 1, wherein a third sensor electrode of the second plurality of sensor electrodes overlaps the first subset of the first plurality of sensor electrodes, the third sensor electrode comprising a plurality of apertures arranged according to the first set of codes.

4. The sensing device of claim 3, wherein the first sensor electrode and the third sensor electrode further overlap a third subset of the first plurality of sensor electrodes.

5. The sensing device of claim 1, wherein the first set of codes comprises first and second coefficients, and wherein a respective aperture of the plurality of apertures of the first sensor electrode is disposed according to one of the first coefficients and along one of the first plurality of sensor electrodes.

6. The sensing device of claim 1, wherein at least two of the plurality of apertures of the first sensor electrode are disposed along a first sensor electrode of the first subset of the first plurality of sensor electrodes.

7. The sensing device of claim 1, wherein each of the plurality of apertures of the first sensor electrode overlap a portion of one of the first subset of the first plurality of sensor electrodes.

8. The sensing device of claim 1, wherein each of the first plurality of sensor electrodes comprises at least one display electrode of a plurality of display electrodes of a display device, the plurality of display electrodes configured for updating a display of the display device and for capacitive sensing.

9. A sensing device, comprising:
   a first plurality of sensor electrodes;
   a second plurality of sensor electrodes, a first sensor electrode of the second plurality of sensor electrodes overlapping a first subset of the first plurality of sensor electrodes and comprising a plurality of apertures arranged according to a first set of codes and the first subset of the first plurality of sensor electrodes; and
   a processing system communicatively coupled to the first and second pluralities of sensor electrodes, the processing system configured to:
      drive transmitter signals onto the first subset of the first plurality of sensor electrodes;
      receive a first resulting signal with the first sensor electrode of the second plurality of sensor electrodes, the first resulting signal comprising effects corresponding to the transmitter signals;
      drive the first sensor electrode of the second plurality of sensor electrodes with an absolute capacitive sensing signal to receive a second resulting signal with the first sensor electrode of the second plurality of sensor electrodes; and
      determine positional information for an input object based on at least one of the first resulting signal and the second resulting signal.

10. A processing system for a sensing device comprising:
    transmitter circuitry configured to simultaneously drive transmitter signals onto a first subset of a first plurality of sensor electrodes, wherein the transmitter signals are modulated based on different ones of a first set of codes;
    receiver circuitry configured to receive resulting signals corresponding to the transmitter signals with a second plurality of sensor electrodes, a first sensor electrode of the second plurality of sensor electrodes overlapping the first subset of the first plurality of sensor electrodes and comprising a plurality of apertures arranged in rows according to a second set of codes and the first subset of the first plurality of sensor electrodes, wherein each aperture of a first row of the plurality of apertures is arranged according to a first row of the second set of codes and each aperture of a second row of the plurality of apertures is arranged according to a second row of the second set of codes, and wherein the first row of the second set of codes differs from the second row of the second set of codes; and
    a determination module configured to determine first positional information for an input object based on the resulting signals.

11. The processing system of claim 10, wherein the determination module is further configured to determine the first positional information for the input object based on the resulting signals by decoding the resulting signals based on the first set of codes.

12. The processing system of claim 10, wherein the receiver circuitry is configured to acquire a second resulting signal with the first sensor electrode of the second plurality of sensor electrodes by driving the first sensor electrode with absolute capacitive sensing signals, and
    wherein the determination module is further configured to determine second positional information for the input object in a first portion of a sensing region of the sensing device based on the second resulting signal, wherein the first positional information corresponds to a second portion of the sensing region, and the second portion of the sensing region is between the first portion of the sensing region and an input surface of the sensing device.

13. An input device comprising:
    a first plurality of sensor electrodes;
    a second plurality of sensor electrodes, wherein a first sensor electrode and a second sensor electrode of the second plurality of sensor electrodes overlap a first subset of the first plurality of sensor electrodes and comprise first apertures arranged in rows according to a first set of codes and the first subset of the first plurality of sensor electrodes, wherein each aperture of a first row of the first apertures is arranged according to a first row of the first set of codes and each aperture of a second row of the first apertures is arranged according to a second row of the first set of codes, and wherein the first row of the first set of codes differs from the second row of the first set of codes; and
    a processing system coupled to the first and second pluralities of sensor electrodes, the processing system configured to:
       simultaneously drive transmitter signals onto the sensor electrodes of the first subset of the first plurality of sensor electrodes, wherein the transmitter signals are modulated based on different ones of a second set of codes;
       receive first resulting signals with the first sensor electrode and the second sensor electrode of the second plurality of sensor electrodes, the first resulting signals comprising effects corresponding to the transmitter signals; and
       determine first positional information for an input object based on the first resulting signals.

14. The input device of claim 13, wherein the first set of codes comprises first and second coefficients, and wherein a respective aperture of the first apertures is disposed according to one of the first coefficients and along one of the first plurality of sensor electrodes.

15. The input device of claim 13, wherein the processing system is further configured to:
    acquire second resulting signals with the first and second sensor electrodes of the second plurality of sensor electrodes by driving the first and second sensor electrodes of the second plurality of sensor electrodes with absolute capacitive sensing signals, and
    determine second positional information for the input object in a first portion of a sensing region of the input device based on the second resulting signals, wherein the first positional information corresponds to a second portion of the sensing region, and the second portion of the sensing region is between the first portion of the sensing region and an input surface of the input device.

16. The input device of claim 13, wherein the first sensor electrode and the second sensor electrode of the second plurality of sensor electrodes further overlap a second subset of the first plurality of sensor electrodes, and the first sensor electrode and the second sensor electrode of the second plurality of sensor electrodes further comprise second apertures arranged according to the first set of codes and the second subset of the first plurality of sensor electrodes.

17. The input device of claim 13, further comprising a display device having a plurality of display electrodes configured for updating a display of the display device and capacitive sensing, wherein each of the first plurality of sensor electrodes comprises at least one of the plurality of display electrodes.

18. The input device of claim 13, wherein the first and second pluralities of sensor electrodes are configured to interface with a display device.

* * * * *